(12) United States Patent
Choi et al.

(10) Patent No.: US 12,414,173 B2
(45) Date of Patent: Sep. 9, 2025

(54) METHOD FOR MANAGING USER ACCOUNT USING NEAR-FIELD COMMUNICATION IN WIRELESS COMMUNICATION SYSTEM, AND APPARATUS FOR SAME

(71) Applicant: LG ELECTRONICS INC., Seoul (KR)

(72) Inventors: Jingu Choi, Seoul (KR); Minsoo Lee, Seoul (KR); Hongwon Lee, Seoul (KR); Jeonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 458 days.

(21) Appl. No.: 17/909,645

(22) PCT Filed: Jan. 20, 2021

(86) PCT No.: PCT/KR2021/095004
§ 371 (c)(1),
(2) Date: Sep. 6, 2022

(87) PCT Pub. No.: WO2021/182938
PCT Pub. Date: Sep. 16, 2021

(65) Prior Publication Data
US 2023/0109583 A1    Apr. 6, 2023

(30) Foreign Application Priority Data

Mar. 10, 2020   (KR) .................. 10-2020-0029836

(51) Int. Cl.
*H04W 76/14*   (2018.01)
*H04W 12/06*   (2021.01)
(Continued)

(52) U.S. Cl.
CPC ........... *H04W 76/14* (2018.02); *H04W 12/06* (2013.01); *H04W 12/61* (2021.01); *H04W 76/10* (2018.02)

(58) Field of Classification Search
CPC ..... H04W 76/14; H04W 12/06; H04W 12/61; H04W 76/10; H04W 84/18; H04W 4/80
See application file for complete search history.

(56) References Cited

U.S. PATENT DOCUMENTS 10,742,414 B1 * 8/2020 Wieker .................... G06F 21/44
11,030,339 B1 * 6/2021 Ilincic ................. H04L 63/0807
(Continued)

FOREIGN PATENT DOCUMENTS

KR     101713013 B1    3/2017
WO     2016034022 A1    3/2016

*Primary Examiner* — Javier O Guzman
(74) *Attorney, Agent, or Firm* — BRYAN CAVE LEIGHTON PAISNER LLP

(57) ABSTRACT

The present disclosure relates to a method for a third device to perform device authentication in a wireless communication system, and an apparatus for same, which comprises: forming a connection with a first device for being provided with a credential token based on at least one user account related to a specific user; receiving a first message including the credential token; broadcasting an advertisement message including a token identifier (ID) based on the credential token; and forming a connection with a second device through the device authentication of the second device based on the token ID, wherein the success of the device authentication is determined based on whether (i) at least one user account related to the specific user and identified based on the token ID matches (ii) at least one user account among one or more user accounts related to an account-based pairing filter set in the second device.

13 Claims, 24 Drawing Sheets

(51) Int. Cl.
*H04W 12/61* (2021.01)
*H04W 76/10* (2018.01)

(56) References Cited

U.S. PATENT DOCUMENTS

| | | | | |
|---|---|---|---|---|
| 11,238,683 | B1* | 2/2022 | Mars | H04W 12/084 |
| 11,503,462 | B2* | 11/2022 | Shin | G06F 21/35 |
| 2011/0275316 | A1* | 11/2011 | Suumaki | H04L 69/24 |
| | | | | 455/41.1 |
| 2013/0268687 | A1* | 10/2013 | Schrecker | H04W 12/06 |
| | | | | 709/229 |
| 2014/0223516 | A1* | 8/2014 | Vongsouvanh | H04L 63/0815 |
| | | | | 726/4 |
| 2016/0379220 | A1 | 12/2016 | Tunnell et al. | |
| 2017/0070500 | A1 | 3/2017 | Hockey et al. | |
| 2017/0109727 | A1* | 4/2017 | Han | G06Q 20/3674 |
| 2018/0189780 | A1 | 7/2018 | Douglas et al. | |
| 2018/0240096 | A1* | 8/2018 | Patel | H04W 76/15 |
| 2020/0028841 | A1* | 1/2020 | Mars | G06Q 20/308 |
| 2023/0122422 | A1* | 4/2023 | Wang | G06Q 20/327 |
| | | | | 726/7 |

* cited by examiner

[FIG. 1]
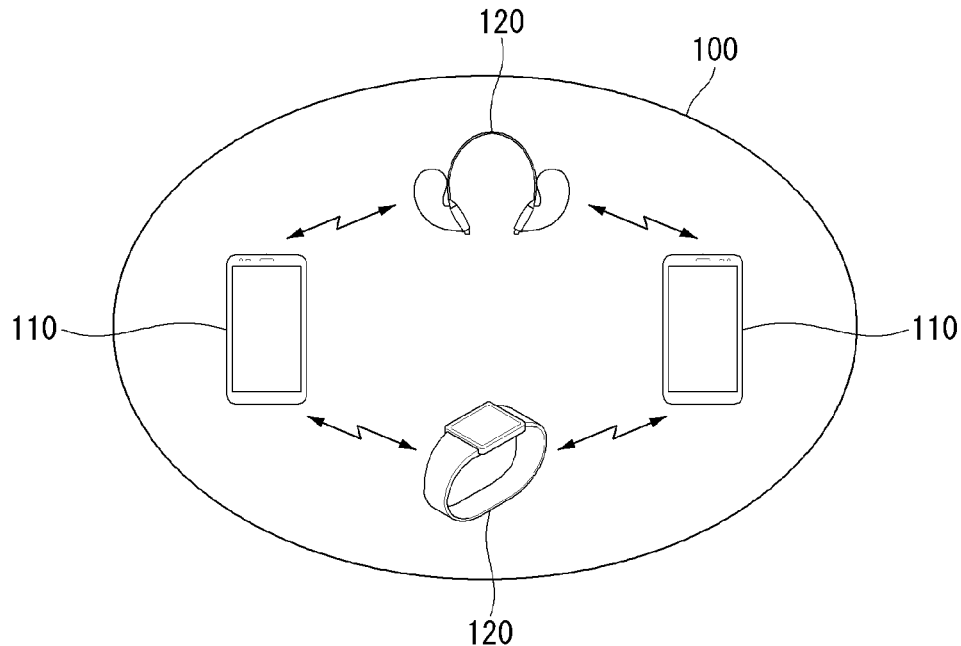
[FIG. 2]
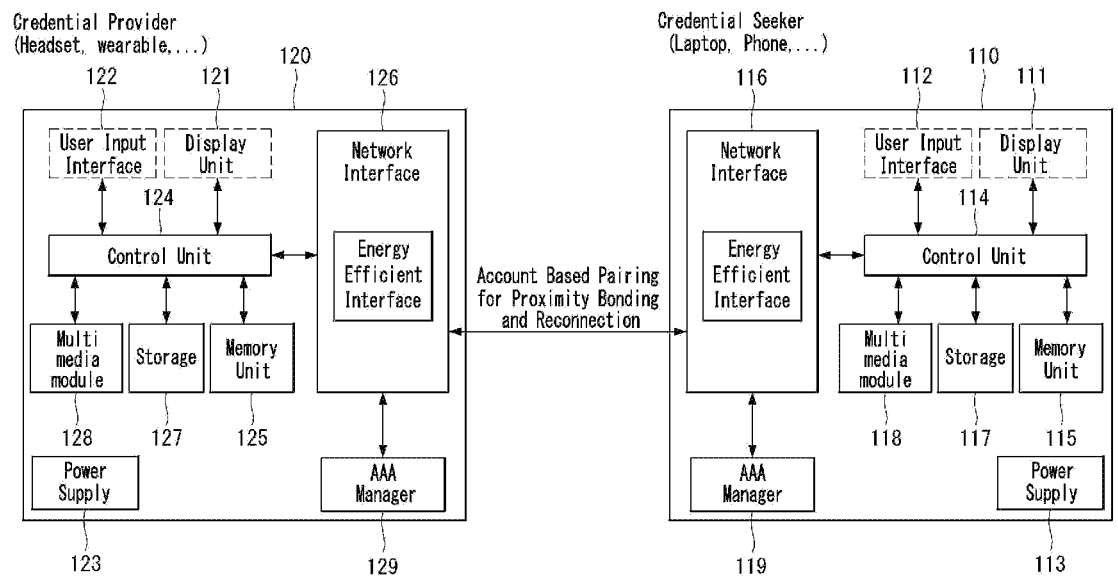

[FIG. 3]
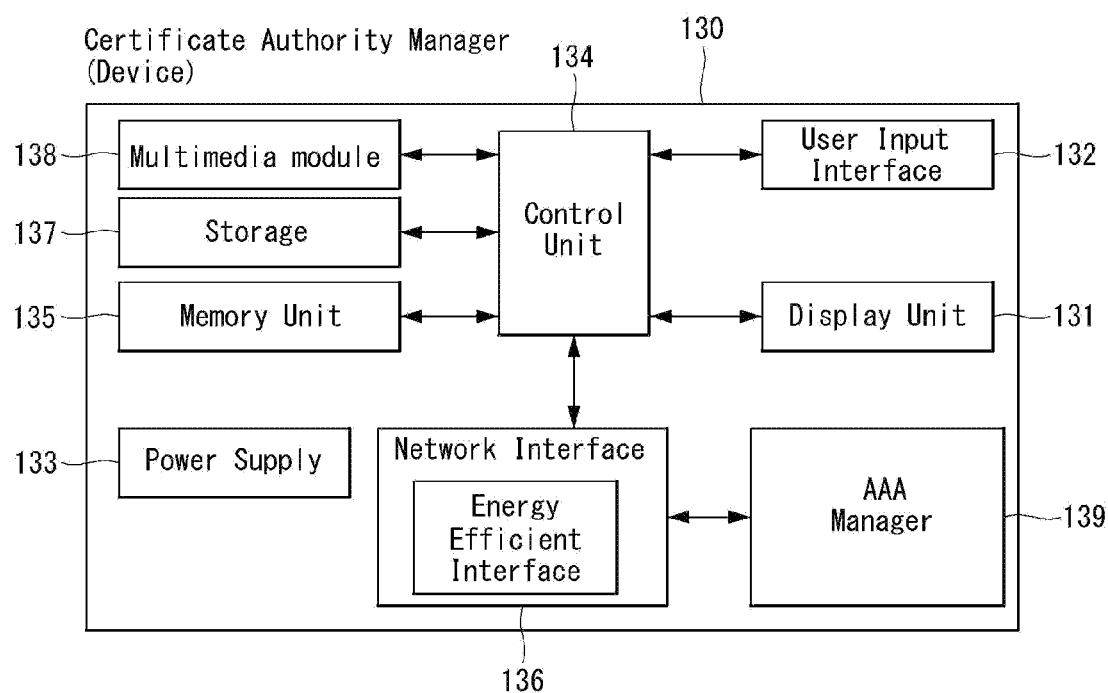

[FIG. 4]
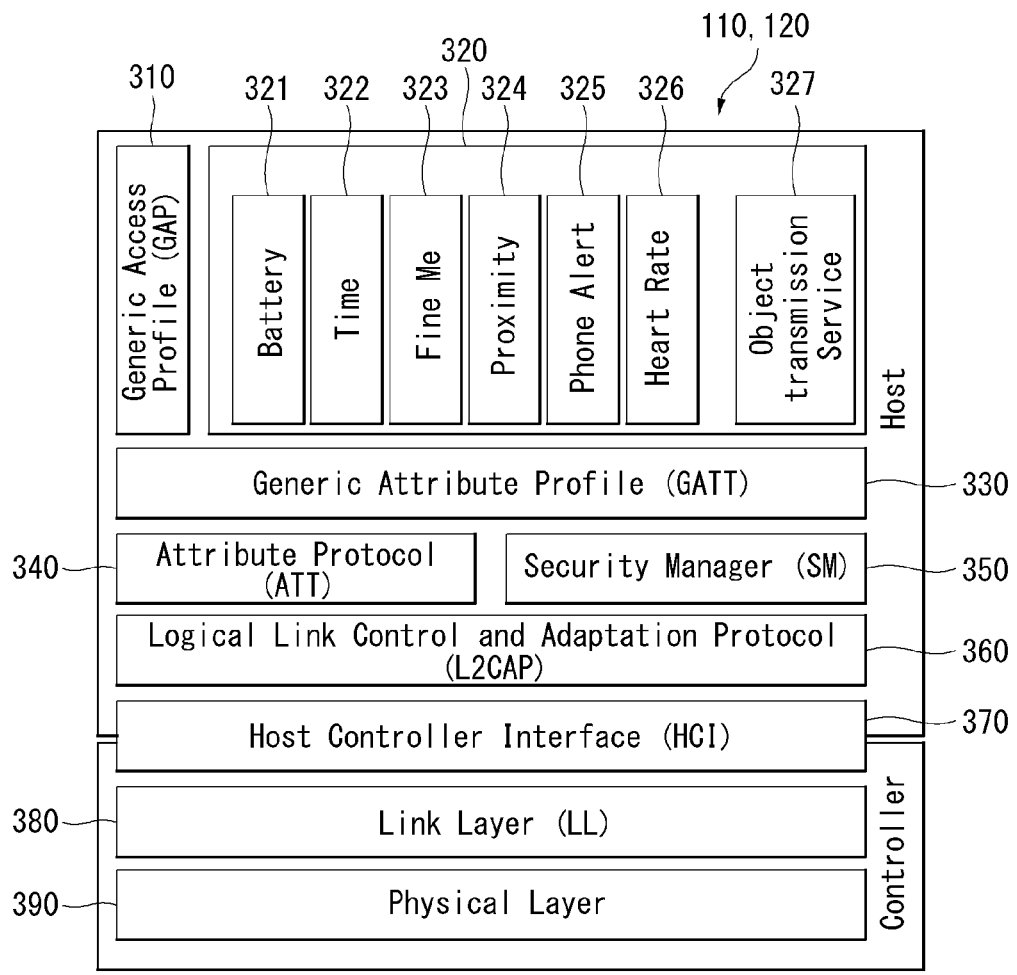

[FIG. 5]
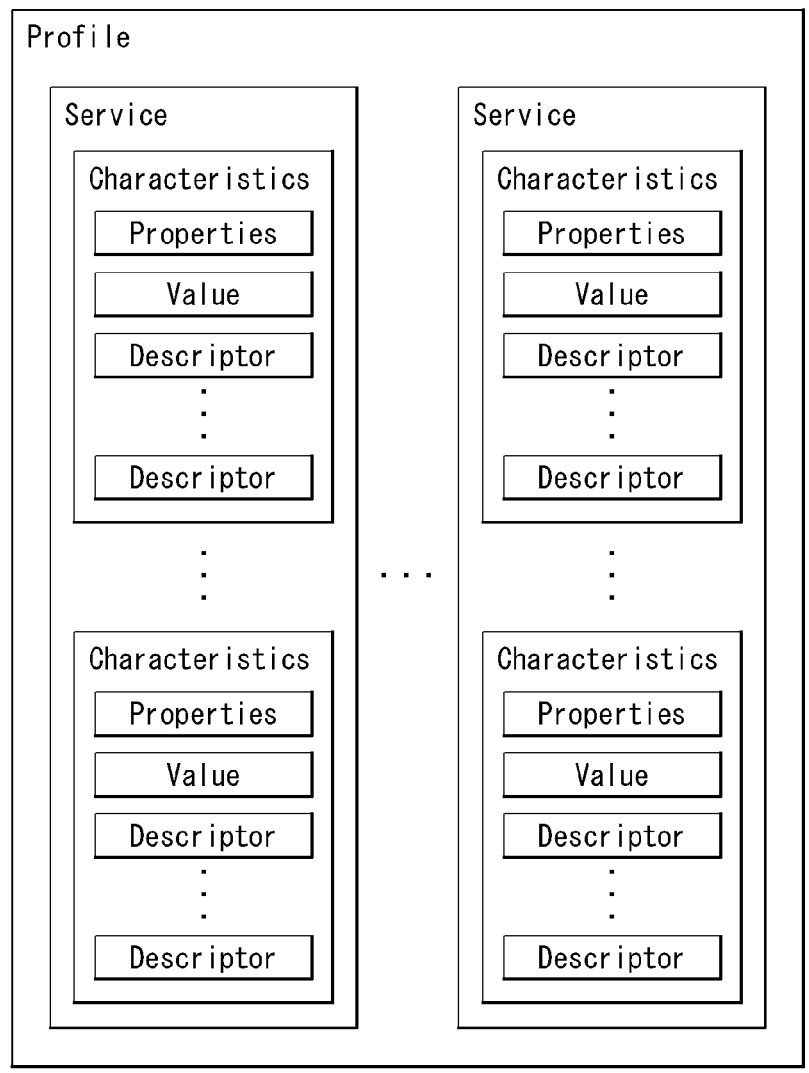

[FIG. 6]
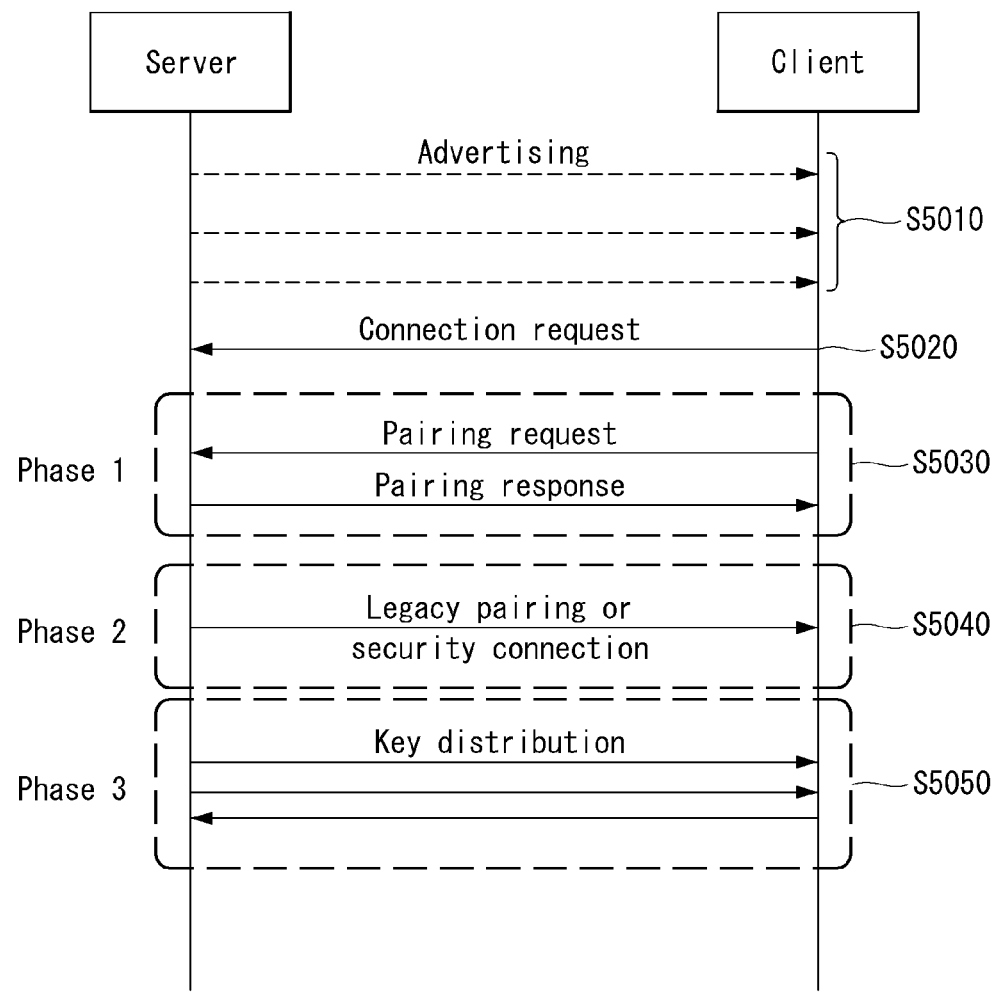

[FIG. 7]
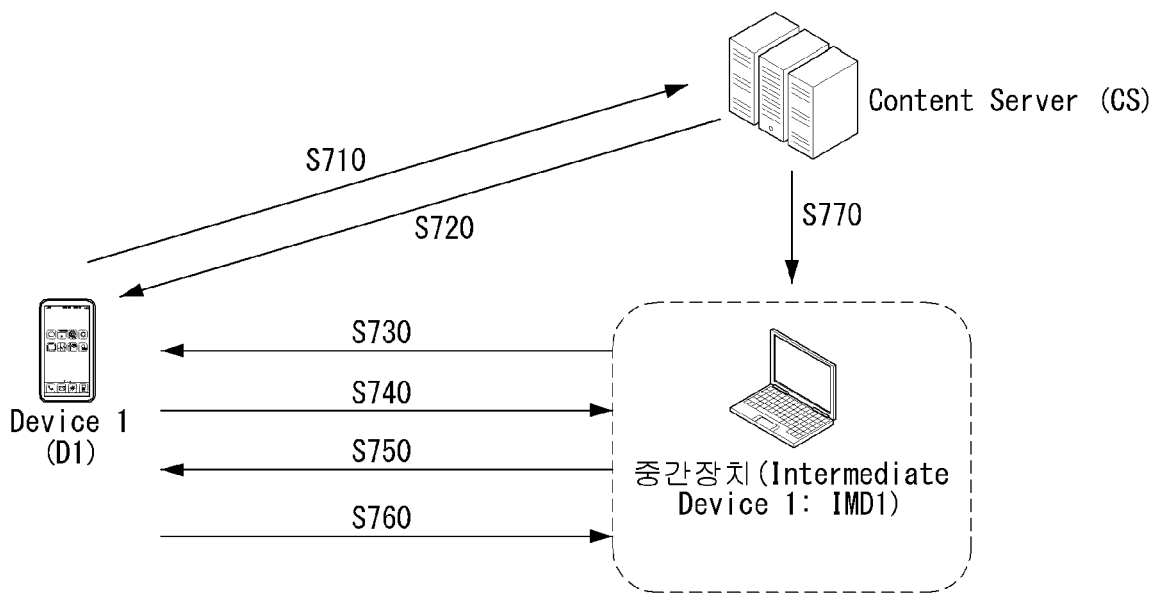
[FIG. 8]
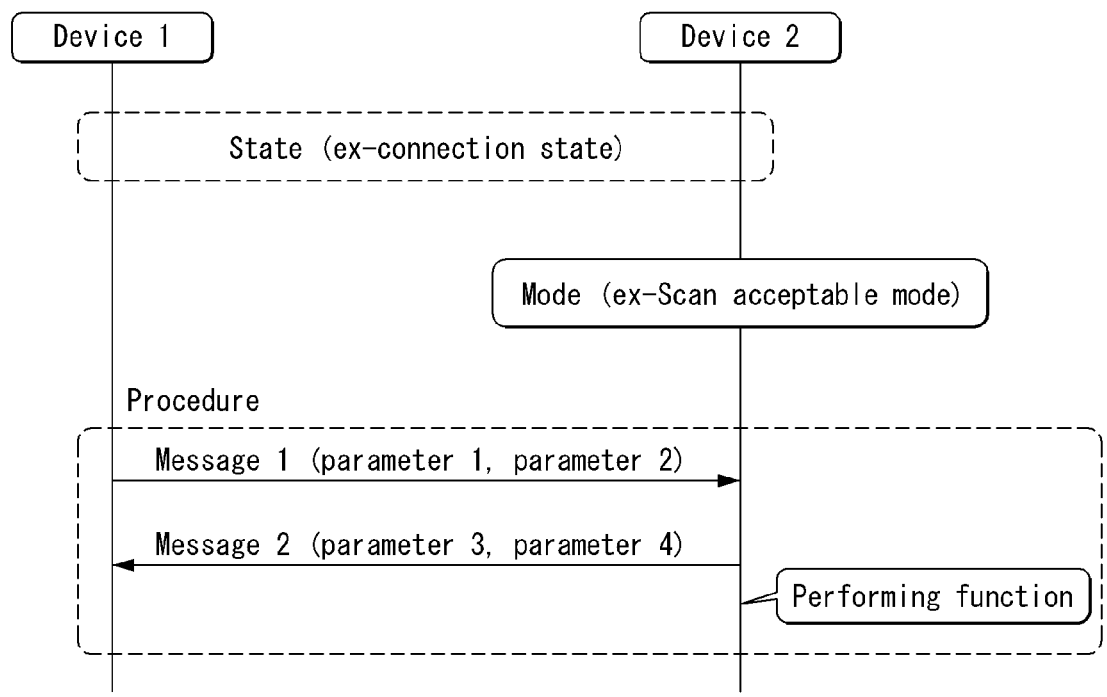

[FIG. 9]
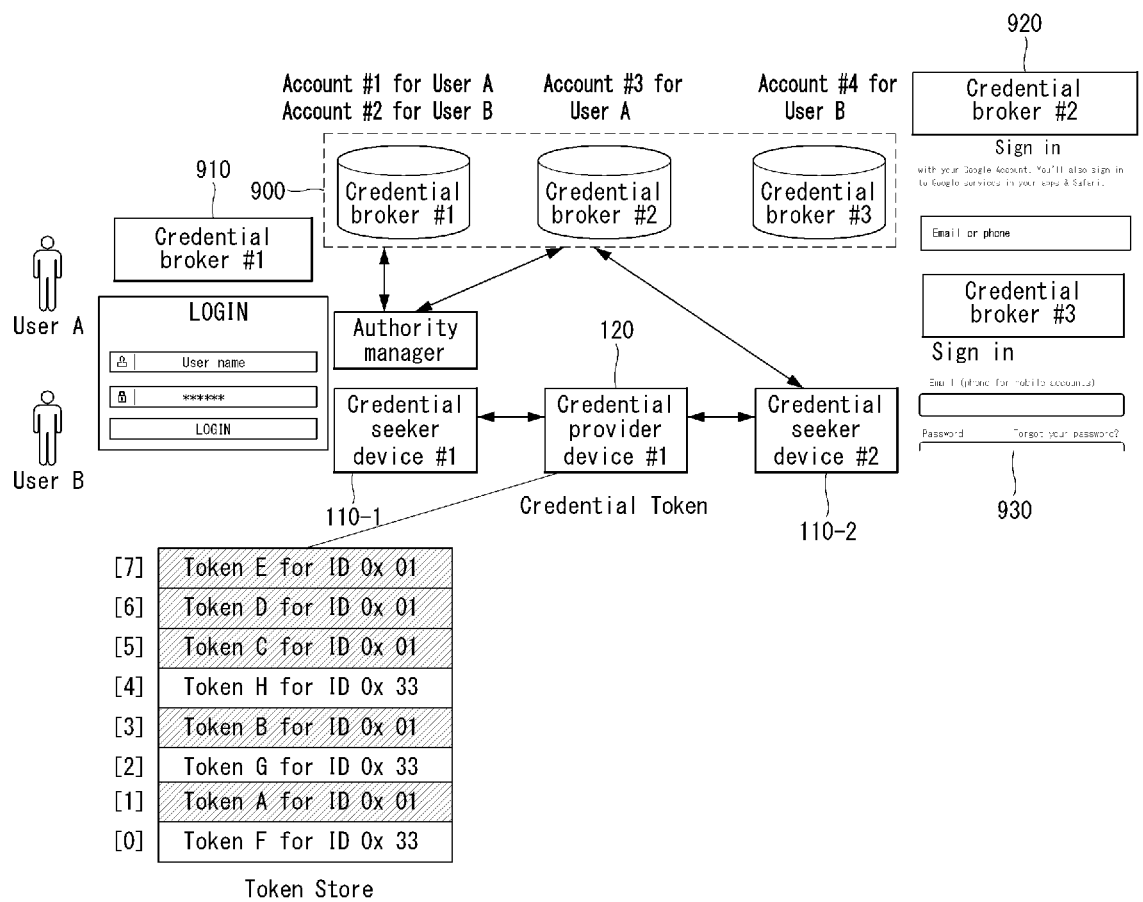

[FIG. 10]
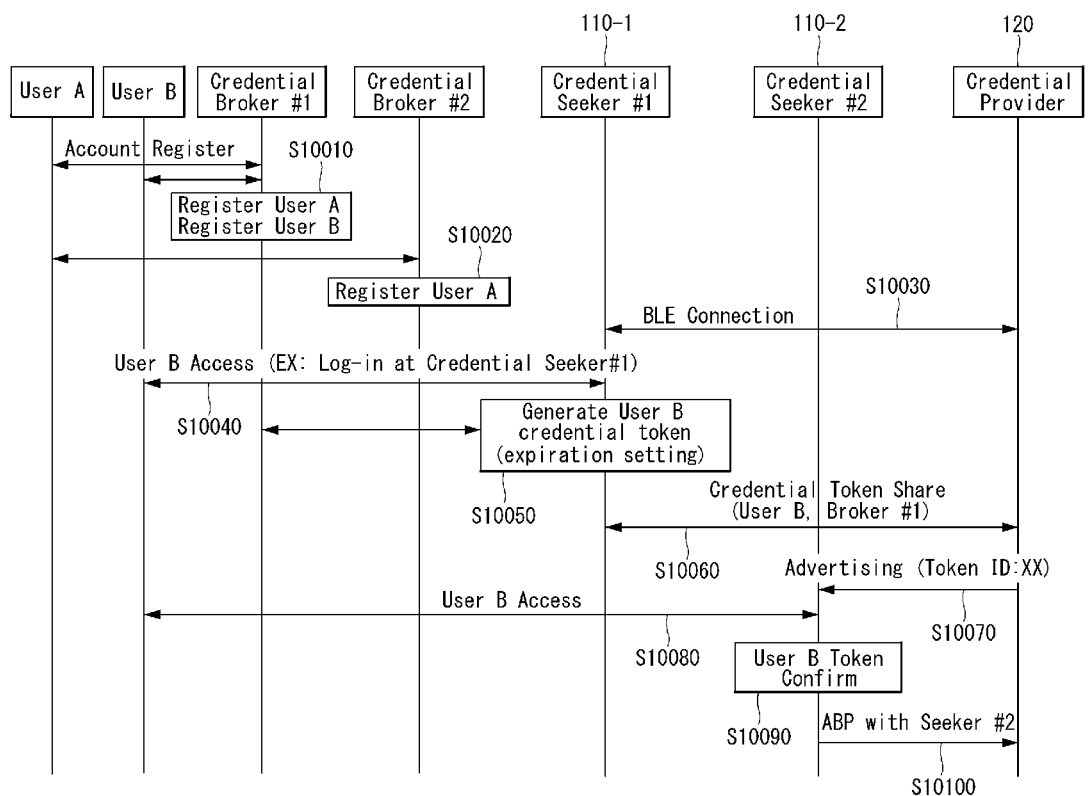

[FIG. 11]
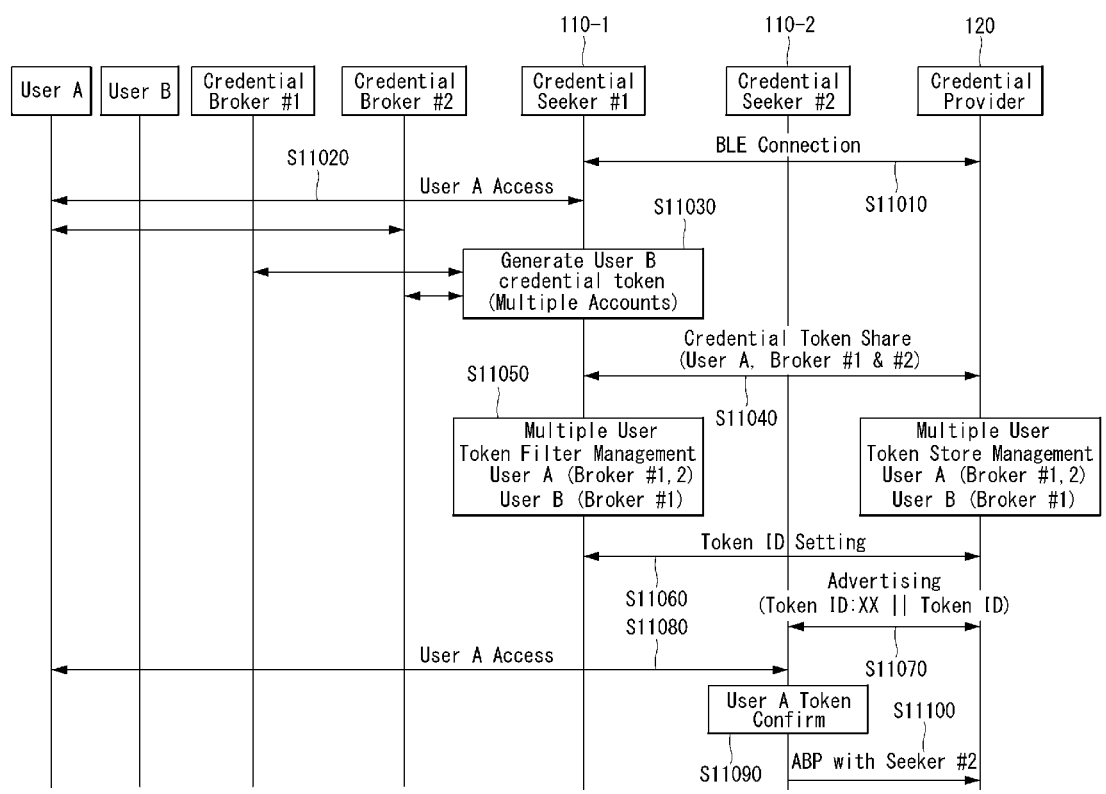

[FIG. 12]
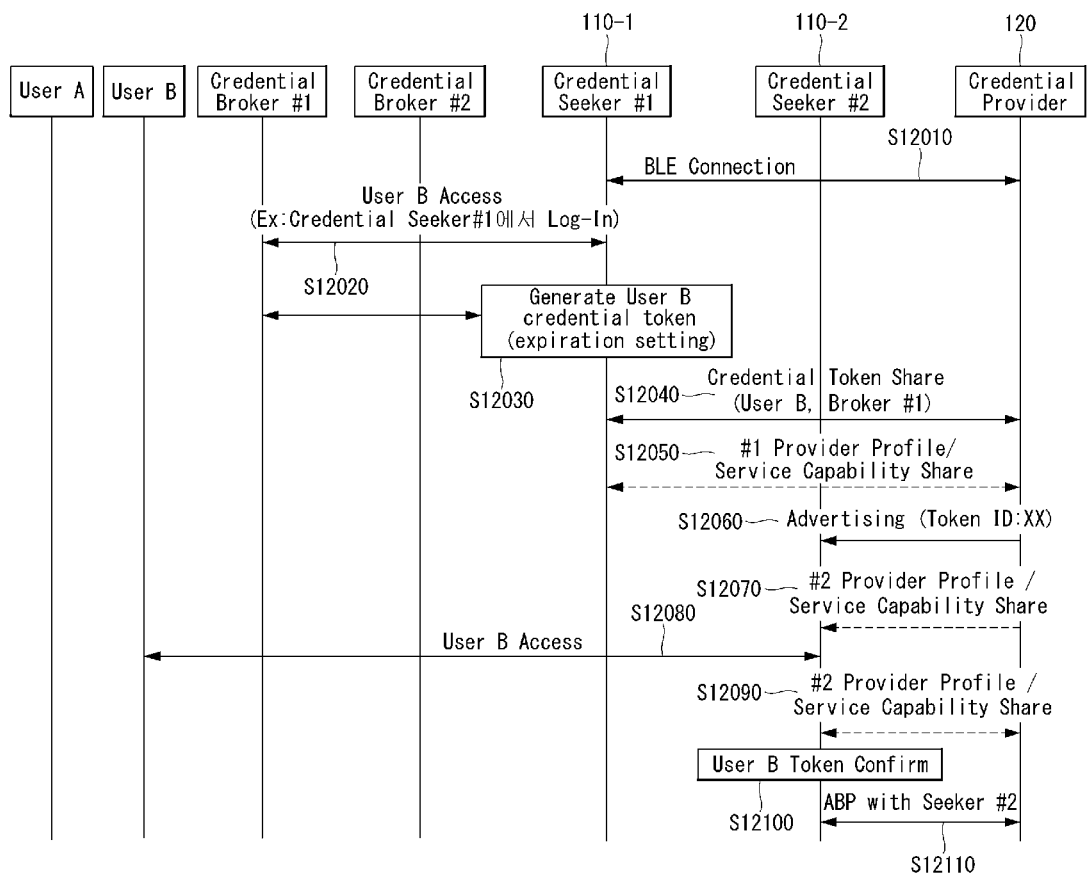
[FIG. 13]
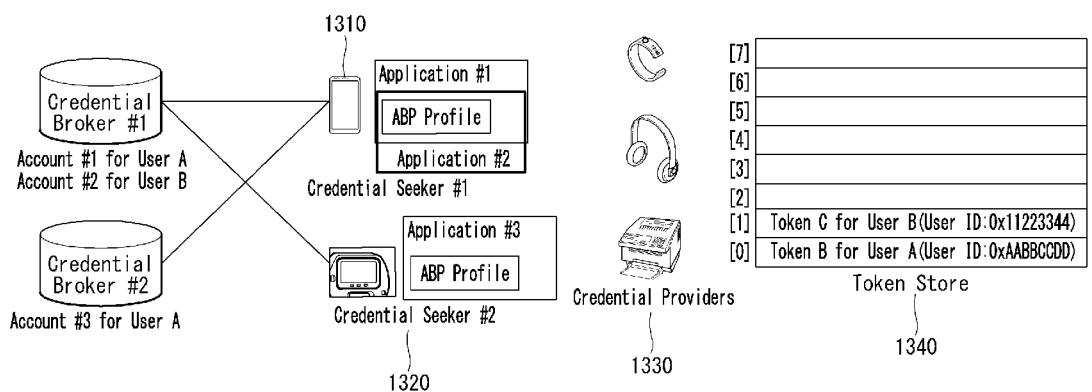

[FIG. 14]
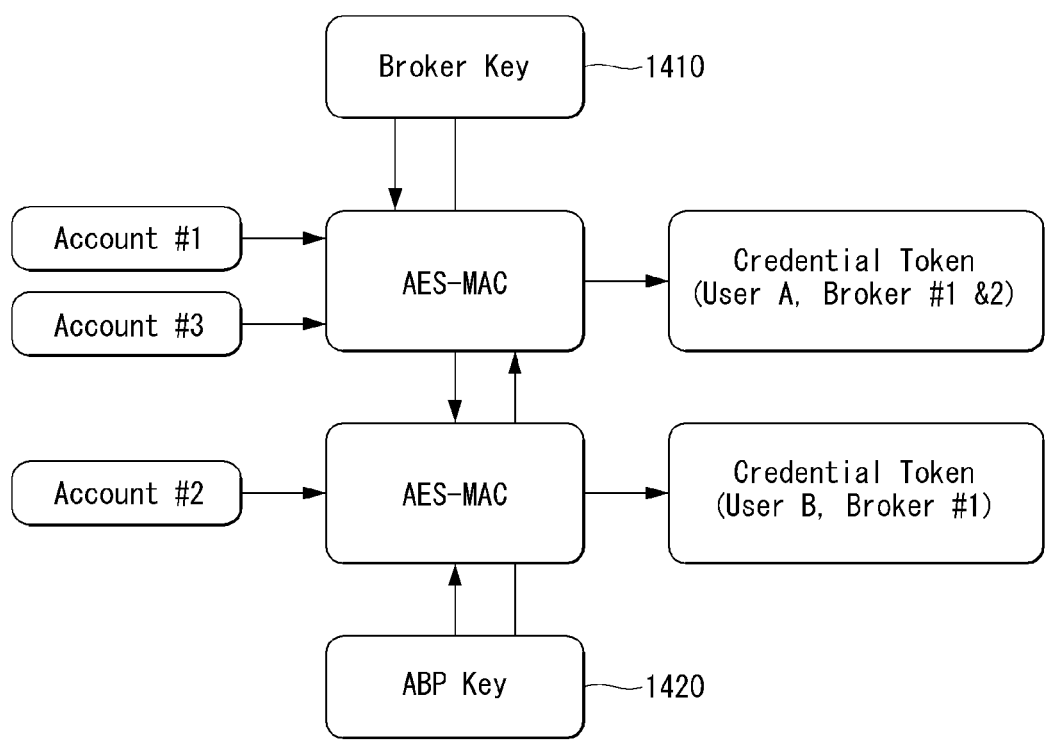

[FIG. 15]
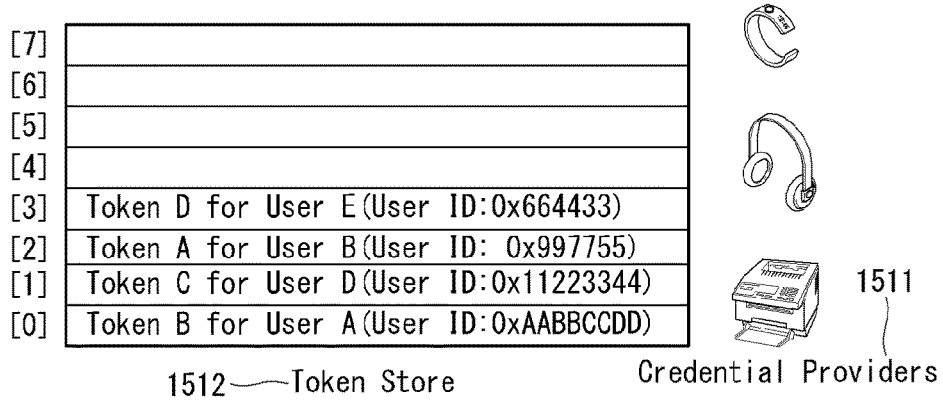
(a)
| ABP AD Type Code | Token Frame 1 (higher preference or priority) | | | | Token Frame 2 (lower preference or priority) | | | |
|---|---|---|---|---|---|---|---|---|
| | User ID | Token Flags | Length | Org. Data | User ID | Token Flags | Length | Org. Data |
| N/A | uint8 | 8bit | uint8 | Variable | uint8 | 8bit | uint8 | Variable |
(b)
(c)

[FIG. 16]
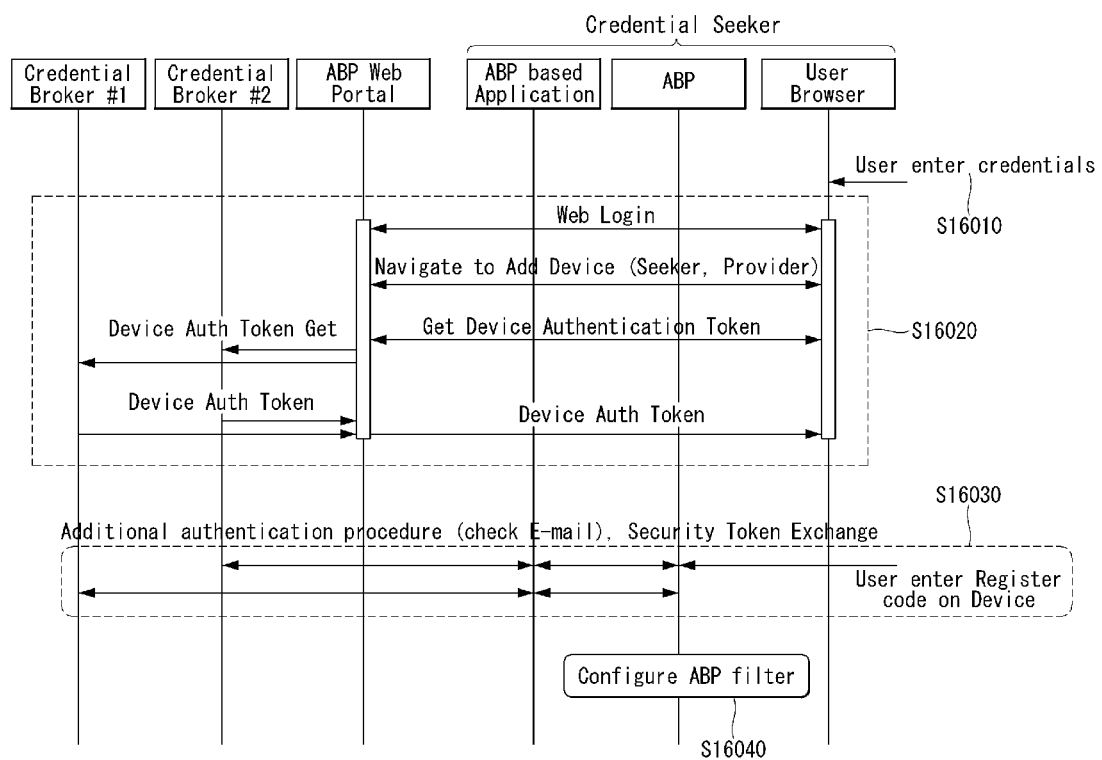

[FIG. 17]
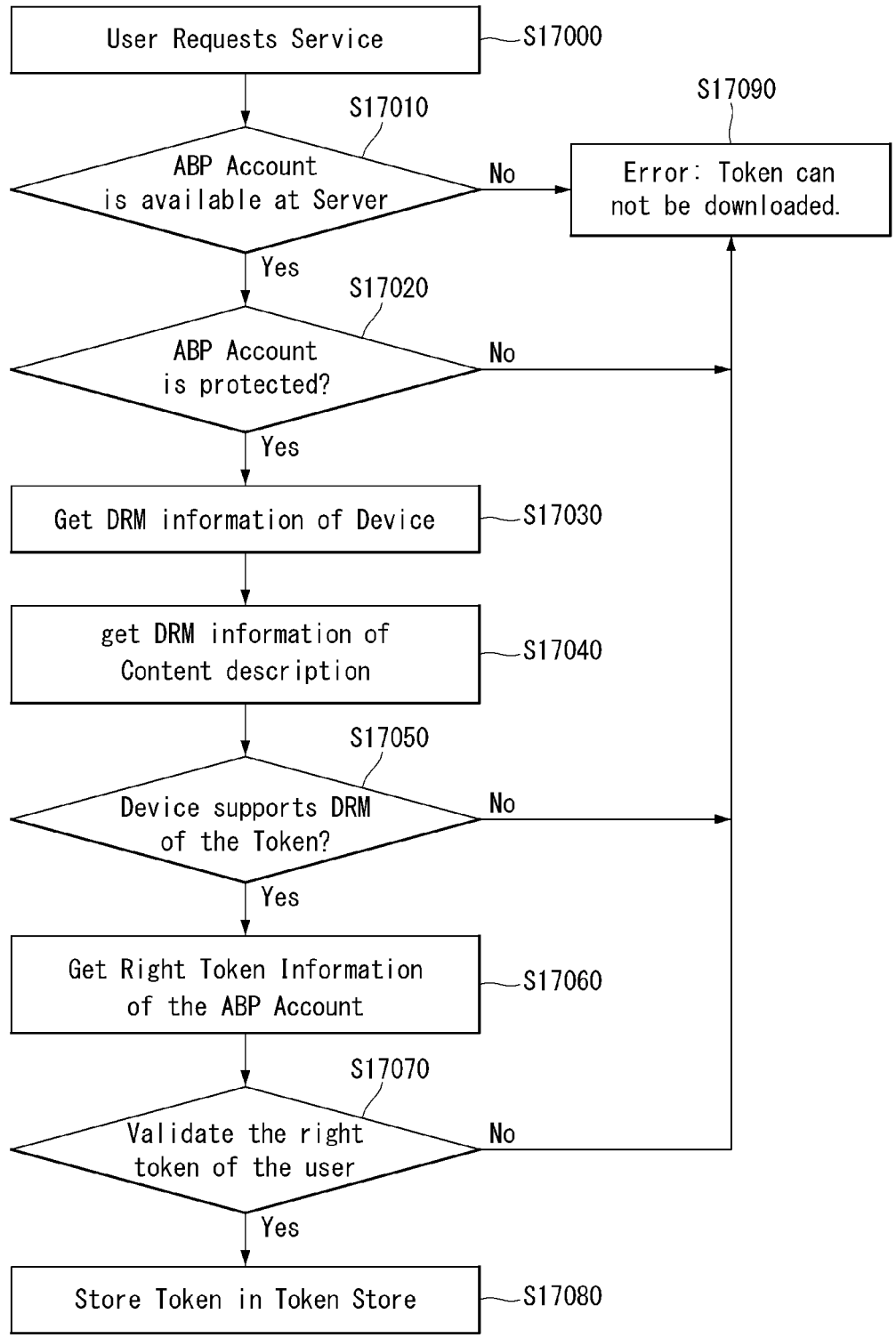

[FIG. 18]
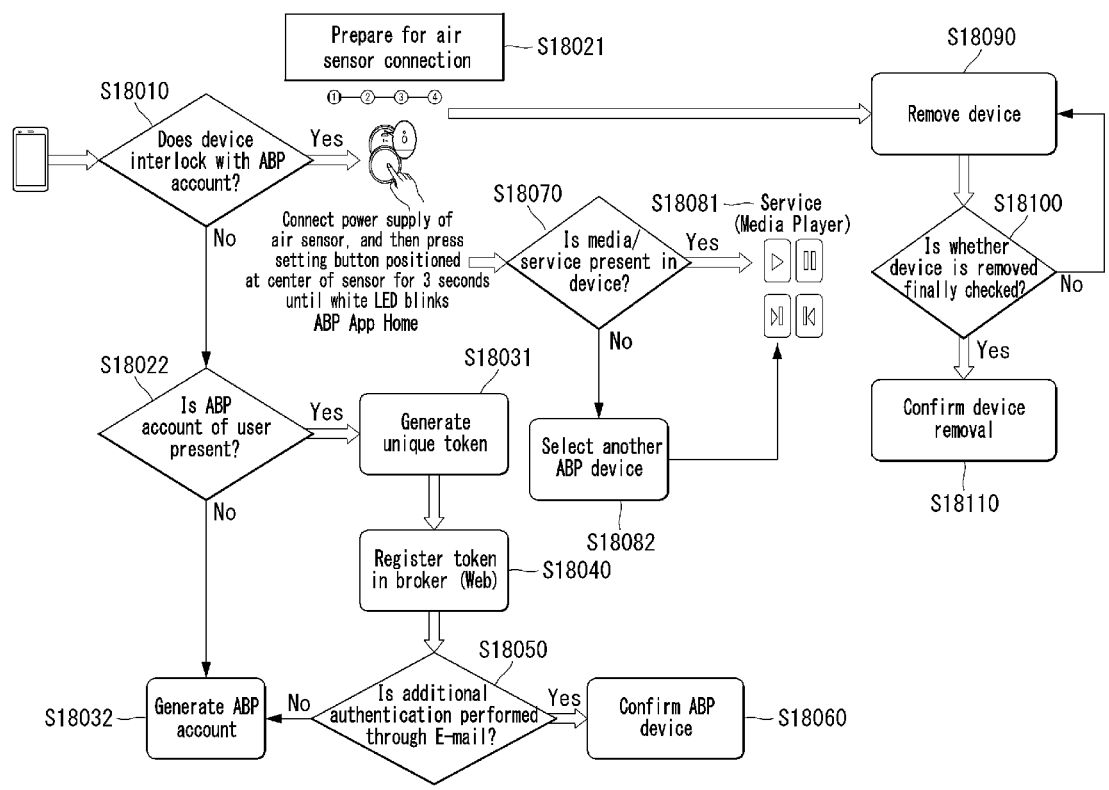

[FIG. 19]
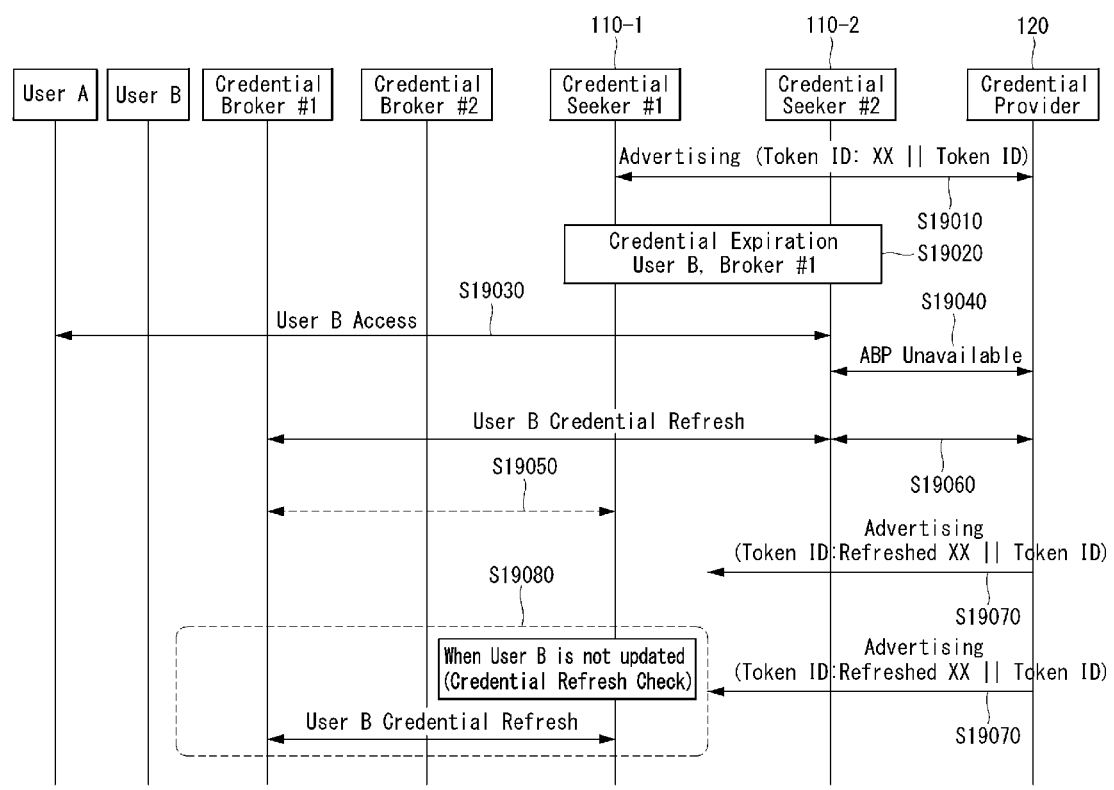

[FIG. 20]
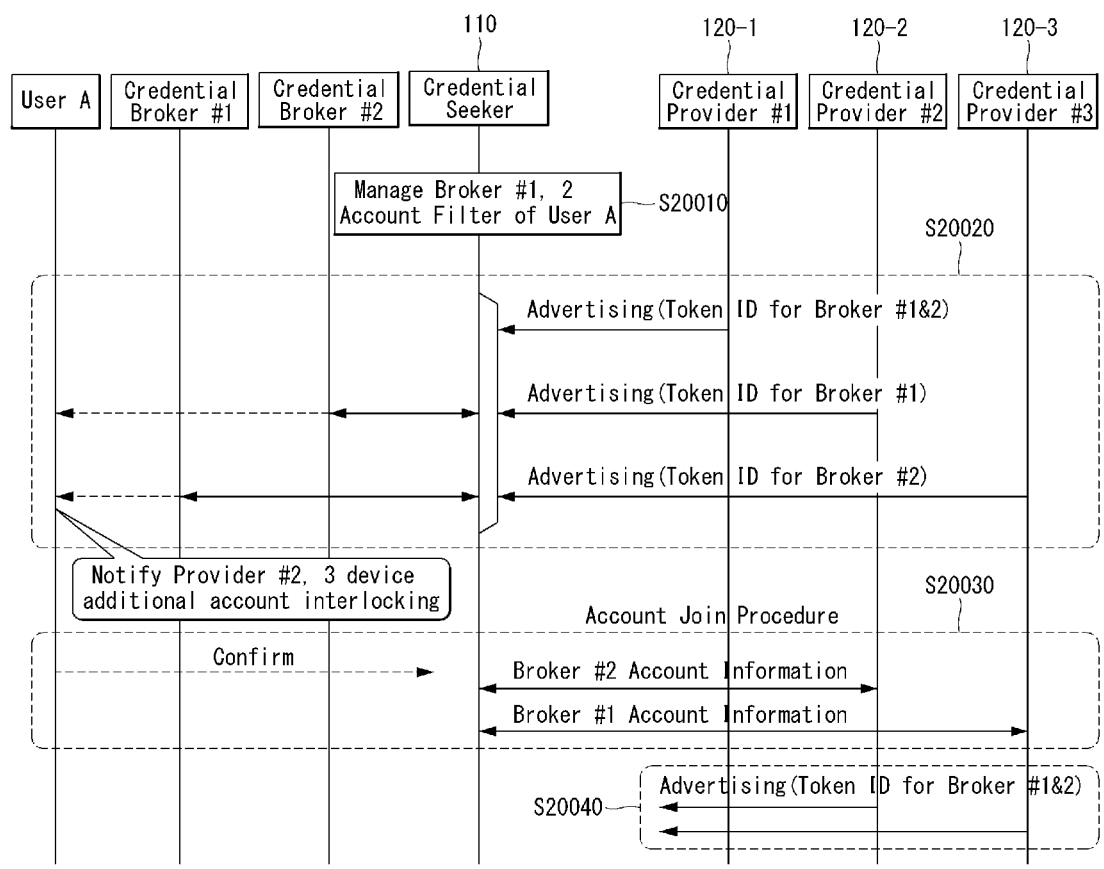

[FIG. 21]
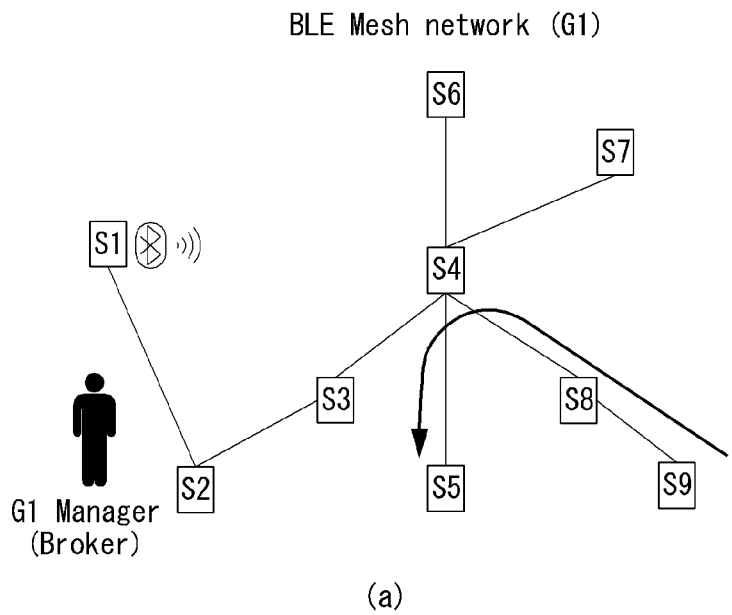
(a)
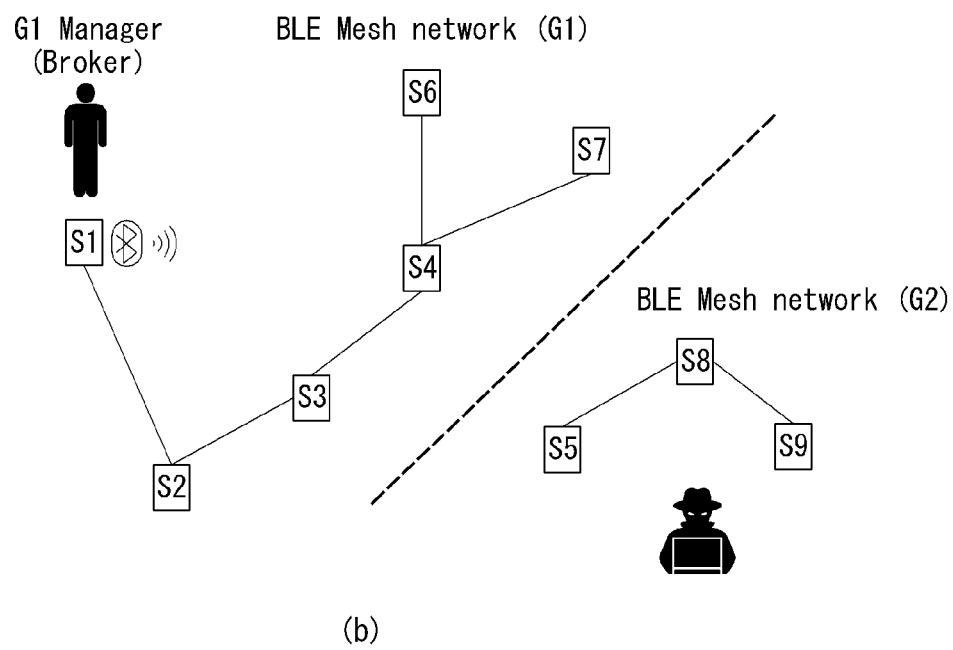
(b)

[FIG. 22]
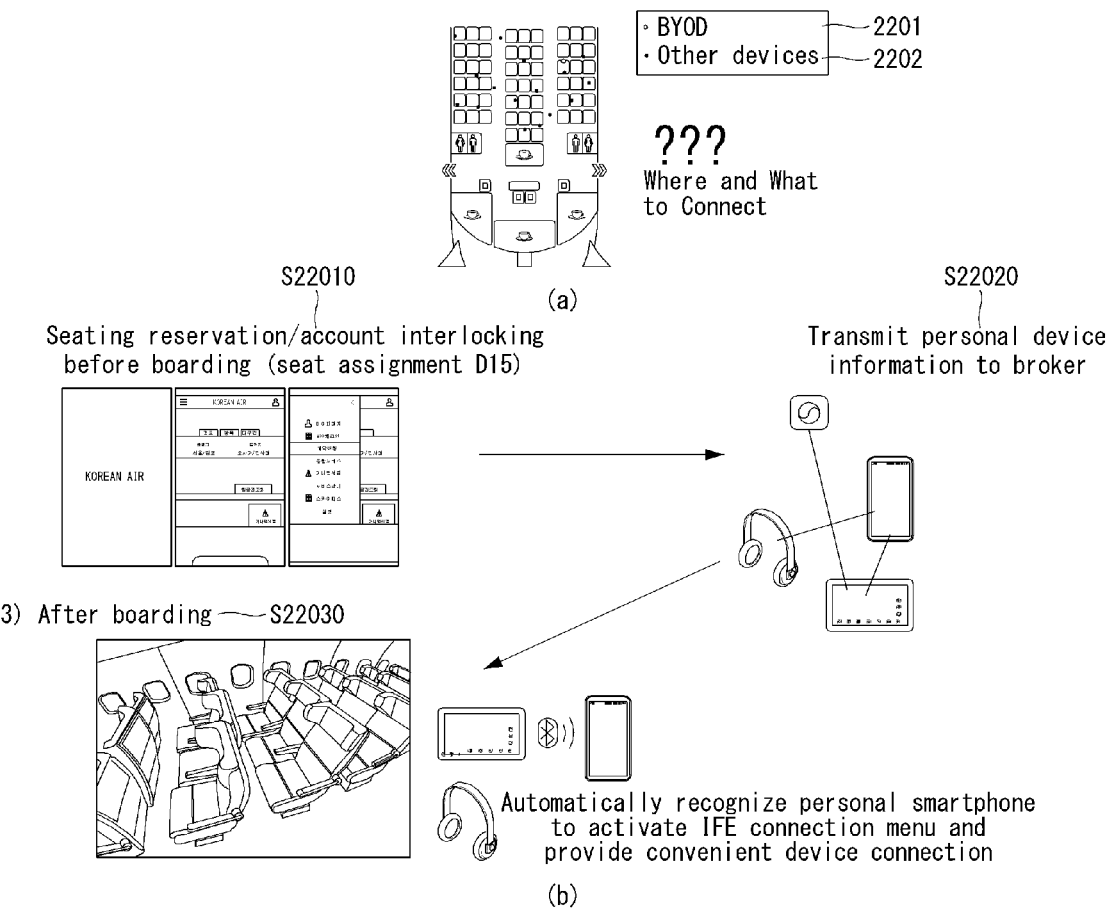

[FIG. 23]
1) Automatic connection using proximity detection
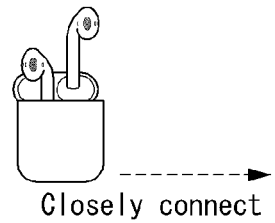
Closely connect
2) Service using
Ex: Using both wireless charging and smartphone screen sharing
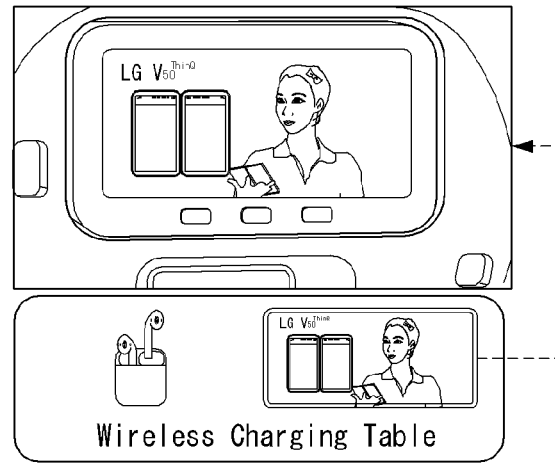
Wireless Charging Table
Watching while charging

[FIG. 24]
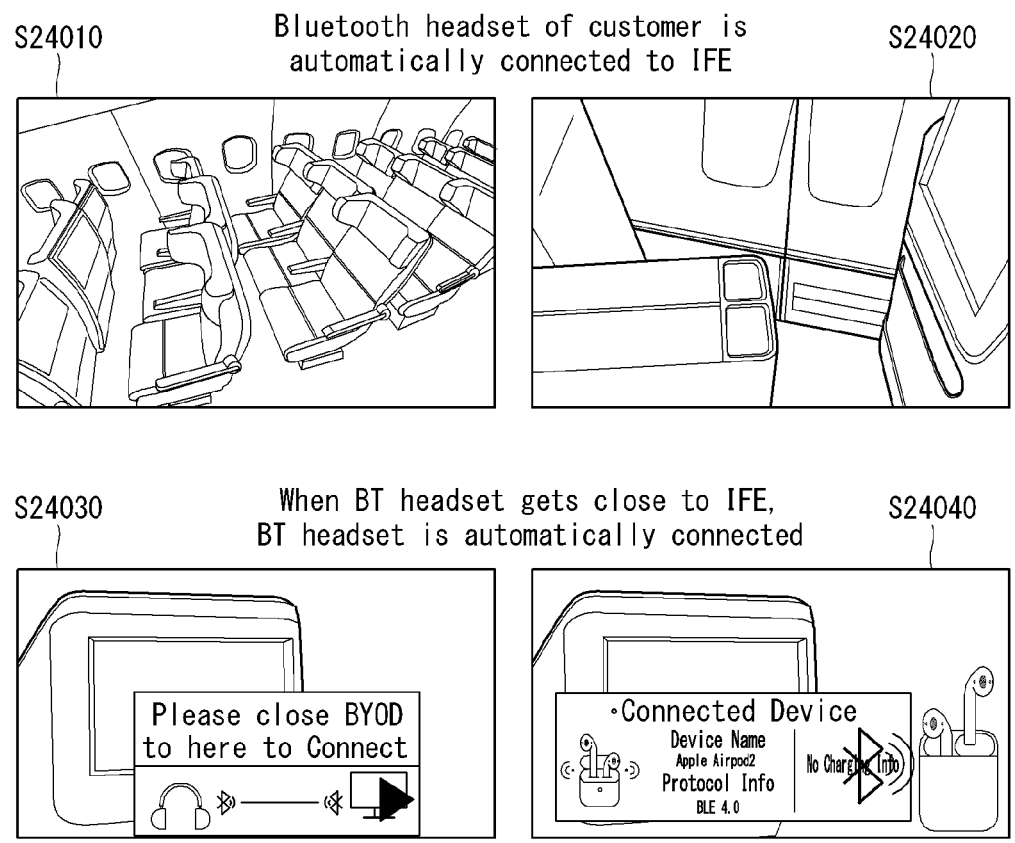

[FIG. 25]
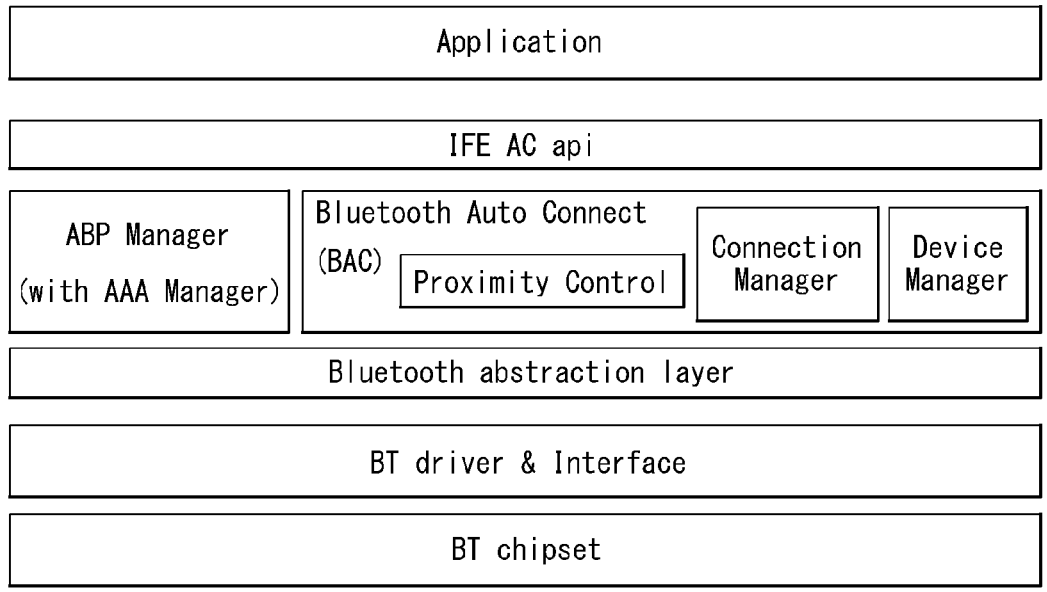
[FIG. 26]
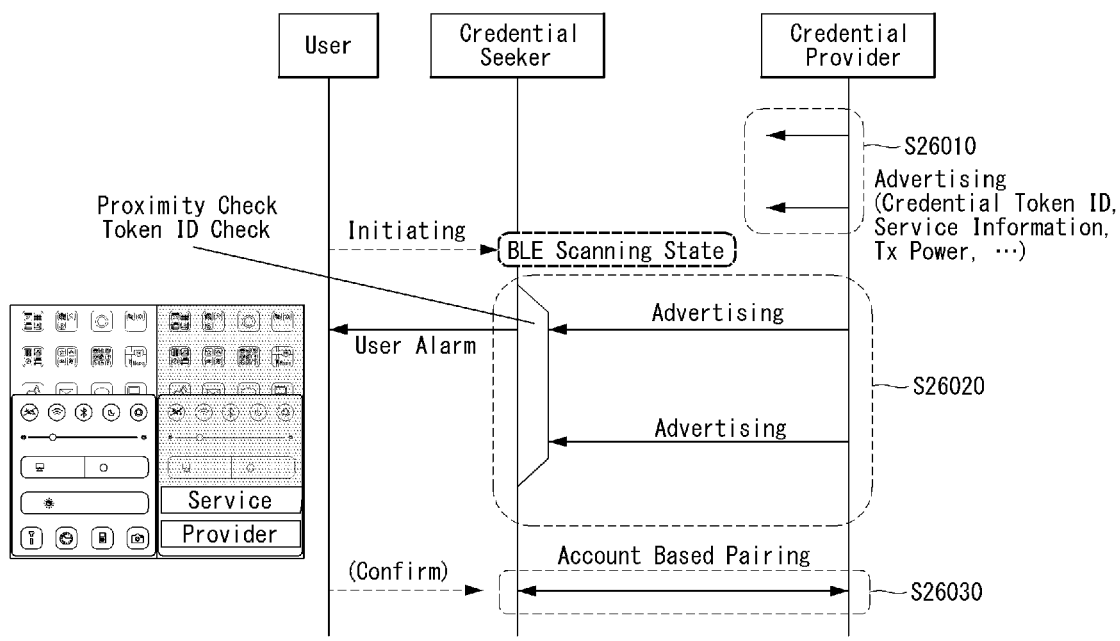

[FIG. 27]

Example of Advertising Message (Parameters)

| AD Type | AD Date |
|---|---|
| <<Credential Token ID>> | AABBCC |
| <<Broker ID or Name>> | Google |
| <<Account ID or Name>> | Jingu.choi |
| <<Service Information>> | Audio, Stored Contents, ... |
| <<Tx Power>> | -10dBm |

(a)

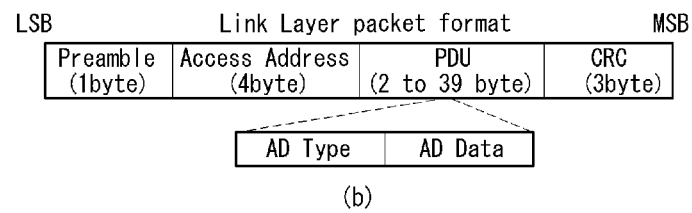

(b)

| ABP Type | Token Frame #1 | Token ID #2 |
|---|---|---|

(c)

| | ABP AD Type Code | Token Frame 1 (higher preference or priority) | | | | Token Frame 2 (lower preference or priority) | | | |
|---|---|---|---|---|---|---|---|---|---|
| | | User ID | Token Flags | Length | Token Data | User ID | Token Flags | Length | Token Data |
| Data Type | N/A | uint8 | 8bit | uint8 | Variable | uint8 | 8bit | uint8 | Variable |
| Size | 1 octet | 1 octet | 1 octet | 1 octet | 0-? octets | 1 octet | 1 octet | 1 octet | 0-? octets |

(d)

[FIG. 28]
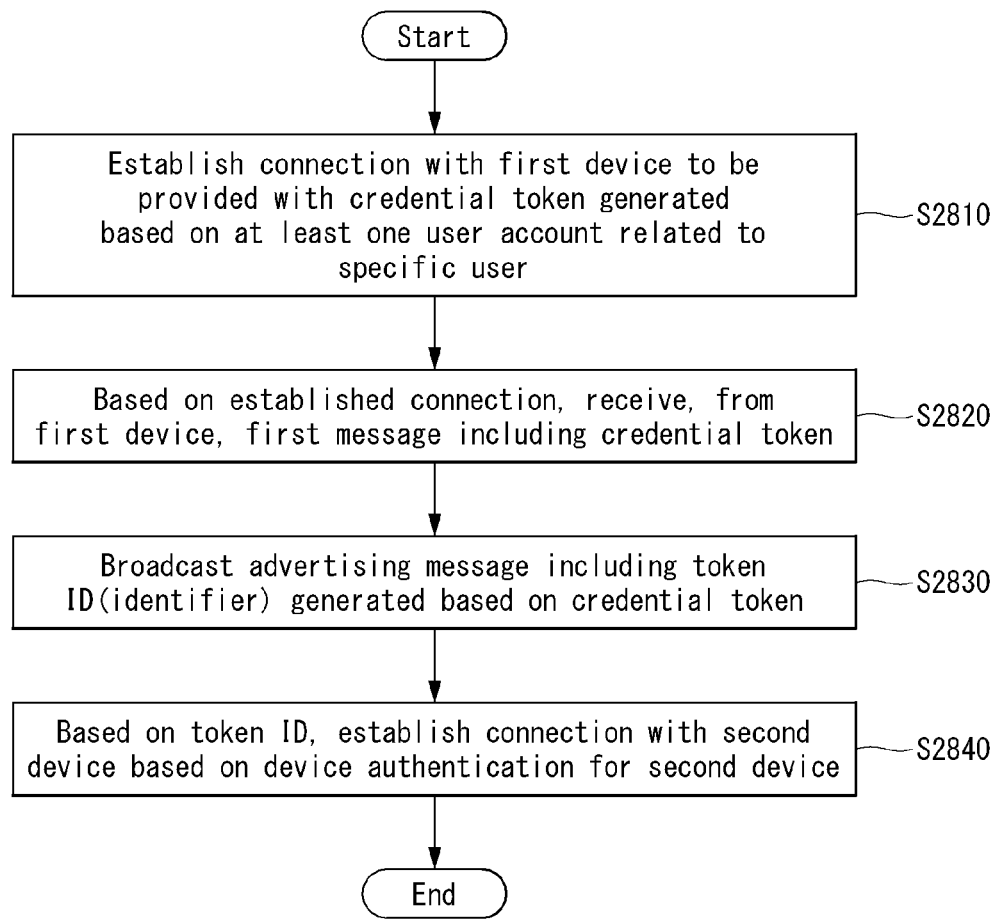

METHOD FOR MANAGING USER ACCOUNT USING NEAR-FIELD COMMUNICATION IN WIRELESS COMMUNICATION SYSTEM, AND APPARATUS FOR SAME

CROSS-REFERENCE TO RELATED APPLICATION

This application is the National Stage filing under 35 U.S.C. 371 of International Application No. PCT/KR2021/095004, filed on Jan. 20, 2021, which claims the benefit of KR Application No. 10-2020-0029836, filed on Mar. 10, 2020, the contents of which are all hereby incorporated by reference herein in their entirety.

TECHNICAL FIELD

The present disclosure relates to a wireless communication system, and more particularly, to a user account management method using short-range wireless communication and an apparatus therefor.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method of performing a device authentication, by a third device, in a short range wireless communication system, and an apparatus therefor.

Further, an object of the present disclosure is to provide a method of automatically establishing, by a third device, a connection with another device of the same user without an additional authentication in a wireless communication system, and an apparatus therefor.

Further, an object of the present disclosure is to provide a device authentication method through a plurality of accounts of a single user by a third device in a wireless communication system, and an apparatus therefor.

Further, an object of the present disclosure is to provide a device authentication method through accounts of a plurality of users of a third device in a wireless communication system, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method, by a third device, of performing a device authentication in a near-field wireless communication system, and an apparatus for same.

More specifically, in the present disclosure, a method of performing a device authentication, by a third device, in a short range wireless communication system, the method comprising: establishing a connection with a first device to be provided with a credential token generated based on at least one user account related to a specific user; based on the established connection, receiving, from the first device, a first message including the credential token; broadcasting an advertising message including token ID (identifier) generated based on the credential token; and based on the token ID, establishing a connection with a second device based on the device authentication for the second device, wherein whether or not the device authentication succeeds is determined based on whether (i) the at least one user account related to the specific user identified based on the token ID matches (ii) at least one of one or more account related to an account based pairing filter configured in the second device.

Furthermore, in the present disclosure, wherein based on that (i) the at least one user account related to the specific user identified based on the token ID matches (ii) the at least one of the one or more account related to the account based pairing filter configured in the second device, the device authentication succeeds.

Furthermore, in the present disclosure, wherein based on that (i) the at least one user account related to the specific user identified based on the token ID is different from (ii) all of the at least one of the one or more account related to the account based pairing filter configured in the second device, the device authentication fails.

Furthermore, in the present disclosure, wherein the credential token is a single credential token generated by integrating the at least one user account related to the specific user, and wherein the token ID is a integrated token ID generated based on the single credential token.

Furthermore, in the present disclosure, further comprising: storing the token ID in a token store for storing and managing at least one token ID, wherein an expiration time value related to a time when the credential token expires is configured to the credential token.

Furthermore, in the present disclosure, wherein based on a presence of another user of the first device in addition to the specific user, further comprising: establishing a connection with the first device to be provided with another credential token generated based on at least one user account related to the another user; based on the established connection, receiving, from the first device, a second message including the another credential token; and generating another token ID based on the another credential token, wherein the another token ID is stored in the token store.

Furthermore, in the present disclosure, further comprising: determining a token ID which is included in the advertisement message and is transmitted based on a user input.

Furthermore, in the present disclosure, further comprising: based on the credential token and the another credential token, generating a group token ID in which on the credential token and the another credential token are grouped, wherein the advertising message includes the group token ID.

Furthermore, in the present disclosure, the method further comprising: removing the token ID from the token store based on the expiration time value configured in the credential token, wherein an advertisement message transmitted after the token ID is removed does not include the token ID.

Furthermore, in the present disclosure, wherein based on a removal of the token ID, the device authentication based on the token ID is not performed.

Furthermore, in the present disclosure, wherein based on that the specific user uses another user account in addition to the at least one user account related the specific user after a time of the token ID is generated, further comprising: receiving, from the first device, a second message including information on the another user account.

Furthermore, in the present disclosure, further comprising: updating the token ID based on the information on the another user account, wherein the updated token ID is related to the at least one user account related to the specific user and the another user account.

Furthermore, in the present disclosure, wherein an advertisement message transmitted after the token ID is updated is transmitted including the updated token ID.

Furthermore, in the present disclosure, wherein the at least one user account related to the specific user is a user account related to a different application, respectively.

Furthermore, in the present disclosure, wherein the third device is included in a mesh network including a plurality of devices to form a part of the mesh network, wherein all messages exchanged between the plurality of devices are transmitted to another device only through the third device.

Furthermore, in the present disclosure, a third device of performing a device authentication in a short range wireless communication system, the third device comprising: a transmitter for transmitting a radio signal; a receiver for receiving a radio signal; and a processor operatively connected to the transmitter and the receiver, wherein the processor is configured to control: the transmitter and the receiver to establish a connection with a first device to be provided with a credential token generated based on at least one user account related to a specific user; the receiver, based on the established connection, to receive, from the first device, a first message including the credential token; the transmitter to broadcast an advertising message including token ID (identifier) generated based on the credential token; and the transmitter and the receiver, based on the token ID, to establish a connection with a second device based on the device authentication for the second device, wherein whether or not the device authentication succeeds is determined based on whether (i) the at least one user account related to the specific user identified based on the token ID matches (ii) at least one of one or more account related to an account based pairing filter configured in the second device.

Advantageous Effects

According to the present disclosure, there is an effect that a third device can perform a device authentication in a wireless communication system.

Further, according to the present disclosure, there is an effect that the third device can automatically establish a connection with another device of the same user without an additional authentication in the wireless communication system.

Further, according to the present disclosure, there is an effect that the third device can perform the device authentication through a plurality of accounts of a single user in the wireless communication system.

Further, according to the present disclosure, there is an effect that the third device can perform the device authentication through accounts of a plurality of users in the wireless communication system.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present disclosure, provide embodiments of the present disclosure, and together with the detailed description, describe the technical features of the present disclosure.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 illustrates an example of a structure of a generic attribute profile (GATT) of Bluetooth low energy.

FIG. 6 is a flowchart showing an example of a connection procedure method in Bluetooth low energy technology to which the present disclosure is applicable.

FIG. 7 illustrates an example for describing a right token check process between a server and a device.

FIG. 8 is a diagram illustrating an example for helping to understand a mode of a device defined for a device to perform a specific function.

FIG. 9 is a diagram illustrating an example of a mechanism in which account based pairing is performed.

FIG. 10 is a flowchart showing an example of a user account management method for a connection between two devices proposed by the present disclosure.

FIG. 11 illustrates an example for a source device to control various configurations for an audio data output of at least one sink device.

FIG. 12 is a flowchart illustrating another example of a user account management method for a connection between two devices proposed by the present disclosure.

FIGS. 13 and 14 are diagrams illustrating an example of credential token generation in a credential seeker device and token ID management in a credential provider device.

FIG. 15 is a diagram illustrating another example of the credential token generation in the credential seeker device.

FIG. 16 is a diagram illustrating an example of a method of acquiring user account information in a credential seeker device.

FIG. 17 is a flowchart illustrating an example of a method of acquiring and storing a credential token in a credential seeker device.

FIG. 18 is a flowchart illustrating an example of an ABP operation performed by a credential seeker device.

FIG. 19 is a flowchart illustrating an example in which a method for credential termination and credential update is performed.

FIG. 20 is a flowchart illustrating another example in which the method for credential update is performed.

FIG. 21 is a diagram illustrating an example of a scheme of constituting a network of which credential is reinforced.

FIGS. 22 and 23 are diagrams illustrating an example in which a method proposed by the present disclosure is applied to an in-flight system of an aircraft.

FIG. 24 is a diagram illustrating another example in which the method proposed by the present disclosure is applied to the in-flight system of the aircraft.

FIG. 25 is a diagram illustrating an example of a software configuration diagram when the method proposed by the present disclosure is applied to the in-flight system of the aircraft.

FIG. 26 is a flowchart illustrating an example in which a device authentication method proposed by the present disclosure is performed.

FIG. 27 illustrates an example of a message format transmitted in a process of performing a device authentication method proposed by the present disclosure.

FIG. 28 is a flowchart illustrating an example of an operation implemented in a third device for performing a method of performing, by a third device, a device authentication in a wireless communication system proposed by the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As illustrated in FIG. 2, a credential seeker device 110 includes a display unit 111, a user input interface 112, a power supply unit 113, a control unit 114, a memory unit 115, a network interface 116, a storage 117, a multimedia module 118, and an authentication, authorization, accounting (AAA) manager 119.

The display unit 111, the user input interface 112, the power supply unit 113, the control unit 114, the memory unit 115, the network interface 116, the storage 117, the multimedia module 118, and the AAA manager 119 are functionally connected to perform a method proposed by the present disclosure.

Further, the credential provider device 120 includes a display unit 121, a user input interface 122, a power supply unit 123, a control unit 124, a memory unit 125, a network interface 126, a storage 127, a multimedia module 128, an authentication, authorization, accounting (AAA) manager 129.

The display unit 121, the user input interface 122, the power supply unit 123, the control unit 124, the memory unit 125, the network interface 126, the storage 127, the multimedia module 128, and the AAA manager 129 are functionally connected to perform a method proposed by the present disclosure.

The network interfaces 116 and 126 refer to units (or modules) capable of transmitting a request/response, a command, a notification, an indication/check message, etc. or data between devices by using specific communication technology. One or more communication technologies may be implemented through the network interfaces 116 and 126. The network interface may include a communication unit, and the communication unit may include a transmitter/receiver. The communication unit may include a baseband circuit for processing a radio signal. When the embodiment is implemented by software, the aforementioned technique may be implemented by a module (a process, a function, and the like) that performs the aforementioned function. The module may be stored in the memory and executed by the processor. Data may be transmitted to and received from an authentication right manager to be described below through the network interfaces 116 and 126.

The memory units 115 and 125 as units implemented in various types of devices refer to units storing various types of data.

The control units 114 and 124 refer to modules that control an overall operation of the credential seeker device 110 or the credential provider device 120, and transmits and requests a message to the network interfaces 116 and 126 and control to process the message received by the network interfaces 116 and 126.

The control units 114 and 124 may be represented by a control unit, a controller, a processor, and etc.

The control units 114 and 124 may include an application-specific integrated circuit (ASIC), another chipset, a logic circuit, and/or a data processing device.

The control unit 114 controls the communication unit to receive an Advertising message from the credential provider device 120, transmits a Scan Request message to the credential provider device 120, controls the communication unit to receive a Scan Response message from the credential provider device 120 in response to the scan request, and controls the communication unit to transmit a Connect Request message to the credential provider device 120 in order to establish a Bluetooth connection configuration with the credential provider device 120.

In addition, after a Bluetooth LE connection is established through the connection procedure, the control unit 114 controls the communication unit to read or write data by using an attribute protocol from or to the credential provider device 120 using an attribute protocol.

The memory units 115 and 125 may include a read-only memory (ROM), a random access memory (RAM), a flash memory, a memory card, a storage medium, and/or other storage devices.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

The AAA managers 119 and 129 may manage authentication/right grant/account of the device.

As described above, the BLE technology may have a small duty cycle and significantly reduce power consumption through low data rate.

FIG. 3 illustrates another example of an internal block diagram of a device capable of implementing methods proposed by the present disclosure.

As illustrated in FIG. 3, a certificate authority manager device 130 includes a display unit 131, a user input interface 132, a power supply unit 133, a control unit 134, a memory unit 135, a network interface 136, a storage 137, a multimedia module 138, an authentication, authorization, accounting (AAA) manager 139. The certificate authority manager device 130 may be configured as SW entity in addition to a device type.

The display unit 131, the user input interface 132, the power supply unit 1133, the control unit 134, the memory unit 135, the network interface 136, the storage 137, the multimedia module 138, and the AAA manager 139 are functionally connected to perform a method proposed by the present disclosure.

Contents described in FIG. 2 may be equally applied to the display unit 131, the user input interface 132, the power supply unit 1133, the control unit 134, the memory unit 135, the network interface 136, the storage 137, the multimedia module 138, and the AAA manager 139.

FIG. 4 illustrates an example of a Bluetooth communication architecture to which methods proposed by the present disclosure are applicable.

Specifically, FIG. 4 illustrates an example of an architecture of Bluetooth low energy (LE).

As shown in FIG. 4, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration, scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i.E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 5 illustrates an example of a structure of a generic attribute profile (GATT) of Bluetooth low energy.

Referring to FIG. 5, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 6 is a flowchart showing an example of a connection procedure method in Bluetooth low energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Hereinafter, a user account management method using the short range wireless communication in the wireless communication system will be described in detail.

In order to transmit and receive data between devices capable of wireless communication, one device of two devices should seek the other device to which the data is to be transmitted and received, and establish a connection with the other device. Further, a certificate procedure for mutual certificate between two devices should be performed in the process of establishing the connection between two devices. The authentication procedure may be a process of authenticating each other and granting a use right. The user should make various configurations in two devices for which connection is to be established in the process of performing the authentication procedure. In this case, seek, connection, and authentication schemes may vary depending on characteristics of respective devices and wireless communication technologies used by the respective devices. More specifically, when the connection between two devices is first established, a time required for the authentication procedure between two devices may be increased as compared with a case where there is already a connection history. In particular, in a headset, a wearable device, etc., there is inconvenience in user experience (UX) related to an operation of seeking and showing the other device to and from which data is to be transmitted and received to the user and an operation of establishing the connection with the other device due to a limit in size of a display and operation button. In order to solve the inconvenience of the user, improvement of the authentication procedure between two devices for initially establishing the connection between two devices is required.

Further, when two devices establish the connection after the authentication procedure between two devices is performed based on a user's personal account, there is no method capable of managing a case where a single user has multiple accounts or a case where multiple accounts are registered in one device, and this may cause inconvenience of the user. Therefore, even in the case where a single user has multiple accounts or the case where multiple accounts are registered in one device, it is necessary to support authentication, authorization, and credential procedures required in the wireless communication without the inconvenience of the user.

The present disclosure proposes a method of multiple user credential management for connection between two devices (Method 1). More specifically, the method proposes a protocol for automatically establishing the connection between two neighboring devices when sensing that the device such as the headset, a wearable, etc. is close to a device such as a laptop computer, a cellular phone, etc., and acquiring user account information. Further, the method proposes an operation scheme of the device for a case where one user uses multiple accounts or a case where one device manages multiple accounts. Through the proposal, when the user intends to connect and control multiple devices of the user and a specific device, the user may not perform authentication procedures which are many as the multiple devices of the user.

In the present disclosure, the device such as the headset, the wearable, etc., may be called a credential provider, a credential provider device, a third device, etc., and variously expressed within a range interpreted in the same there as or similar thereto, of course. Further, the device such as the laptop computer, the cellular phone, able, etc., may be called a credential seeker, a credential seeker device, a first device, a second device, etc., and variously expressed within a range interpreted in the same there as or similar thereto, of course.

Through the method, a wireless connection between the credential provider and the credential seeker may be easily established based on account information of the user. Further, when the user is not familiar with the manipulation of the credential provider and the credential seeker, the user may establish the connection between two devices without a separate manipulation for two devices. Additionally, when the user possesses multiple accounts related to multiple applications, respectively, the user may not generate a credential token for each account, but generate an integrated credential token which may be applied to all accounts.

Further, the present disclosure proposes a credential expiration and refresh method (Method 2). More specifically, the method proposes a method in which an authority manager device grants a device control authority and credential to other devices, and recovers and changes the granted credential. Here, other devices may be the credential provider device and/or the credential seeker device. The authority manager device checks whether the other device has user information, and grant an authority for control/connection to the other device when the other device has the authenticated user information. Through the method, it is possible for the authority manager device to grant a policy, an authority, and a credential in a specific space to other devices (the credential provider and/or the credential seeker device), and recover and change the policy, the authority, and credential. When a policy manager device authenticates the devices of the user, it is possible for the user to easily connect and control devise in a specific device by using the devices of the user. Further, through the method the user uses the same credential for a long time or performs discarding and update of credential information temporarily used in a specific space, and as a result, a credential strength may be reinforced. Hereinafter, the expression of A and/or B may mean at least one of A and B.

FIG. 7 illustrates an example for describing a right token check process between a server and a device.

The right token checking process is a process for verifying the token of the user who purchases the right for the account and consuming the service/contents by using the device. A mobile headset D1 checks a function of an intermediate device IMD1 and checks whether to download and play DRM protection contents of CS from a target device IMD1.

S710: Device 1 D1 transmits a media list for downloading to the CS.

S720: The CS selects media to be downloaded.

S730: Device 1 D1 and the intermediate device IMD1 perform a device discovery procedure.

S740: Device 1 D1 request capability information of the intermediate device IMD1 to the intermediate device IMD1.

S750: The intermediate device IMD1 transmits capability information thereof to device 1 D1 in response thereto.

S760: Device 1 D1 transmits a Queue request to the intermediate device IMD1.

S770: Thereafter, the CS request media queuing/downloading to the intermediate device IMD1.

In step S750 and step S760 above, the method proposed by the present disclosure may be applied.

When the device performs a specific function, a mode of the device for performing the specific function by the device, a state, a procedure for performing the specific function, a message transmitted and received to perform the specific function, and a parameter included in the message may be defined. This is shown in Table 2, and FIG. 8 is a diagram illustrating an example for helping to understand a mode of a device defined for a device to perform a specific function.

TABLE 2

| Category | Description |
| --- | --- |
| Mode | State in which the device is configured to perform a specific operation |
| State | Indicating which procedure the device is configured to perform on a communication procedure |
| Procedure | A series of procedures which the device is to perform in order to perform a specific function |
| Message | Operation for delivering a parameter between devices |
| Parameter | Data value which a message delivers to a counterpart or a setting value of the device |

Table 3 shows a mode, a state, a procedure, a message, and a parameter defined for the device to perform the methods proposed by the present disclosure.

TABLE 3

| Name | Category | Description |
| --- | --- | --- |
| Credential Exchange | Procedure | Procedure of exchanging user account related information between credential provider and seeker |
| Proximity Authentication | Procedure | Procedure of authenticating that two devices are close to each other |
| Key ID | Parameter | When multiple accounts are managed by one device, ID for classifying key related to each account |
| Guest Key | Parameter | Key which specific service provider (e.g., airline, market, etc.) issues for temporary service use |
| Expiration Period | Parameter | Period in which token is valid |
| Expiration Procedure | Procedure | Procedure of discarding corresponding token upon expiration period |
| Authority Information Exchange | Procedure | Procedure in which authority manager grants service authority to user device |
| Authority Refresh Request/Rep | Message | Message for requesting changing and discarding authority policy of device |
| Temporary User Information | Parameter | Not user information exchange procedure but user information temporarily generated by the device. Devices such as public device require information for recognizing user, but it is difficult to possess user information. In this case, temporary user information is generated and used for recognizing user. |
| Integrated User Information | Parameter | Key or token value generate as result of recognizing user |

Hereinafter, Method 1 and Method 2 will be described in detail based on the aforementioned contents, and for convenience of description, hereinafter, the device which may be expressed as the credential provider device will be collectively referred to as the credential provider device and the device which may be expressed as the credential seeker, etc., will be collectively referred to as the credential seeker device.

Multiple User Credential Management Method for Connection Between Two Devices—(Method 1)

The method relates to a method which automatically establishes the connection between two devices without an additional authentication between two devices or a separate input of the user when two devices has the same account information even though there is a record in which two devices to be connected are connected to each other. Hereinafter, an operation which automatically establishes the connection between two devices without the record of connecting two devices to each other based on the account information may be referred to as account based pairing (ABP), credential-based authorization, etc., and variously referred to a range interpreted in the same thereas/similar thereto.

More specifically, the account of the user is managed and provided by a credential broker. The credential broker may be an application/service provider that provides a specific application/specific service, and the account of the user may be an account which the user generates to use the specific application/specific service provided by the credential broker. That is, when the user generates the account for using an application/service provided by a specific application/service provider, the specific application/service provider may serve as the credential broker. In other words, the specific application/service provider as the credential broker may manage the account of the user, and provide credential token related information between the credential seeker device and the credential provider device to the credential seeker device and the credential provider device. Here, based on the credential token related information provided from the credential broker, even though the connection is not established between the credential seeker device and the credential provider device, the credential seeker device and the credential provider device may automatically establish the connection without the additional authentication or the separate input of the user.

In general, since the credential seeker device and the credential provider device are often devices owned by one user, the credential seeker device and the credential provider device manage only account information for one user. On the contrary, when multiple users are use one device, the credential provider device may store and manage information on multiple credential tokens related to multiple users, respectively in a credential token store.

The above-described contents will be described in more detail with reference to FIG. 9. FIG. 9 is a diagram illustrating an example of a mechanism in which account based pairing is performed. More specifically, FIG. 9 relates to a case where user A accesses credential provider device #1 120 through credential seeker device #2. Further, in FIG. 9, it is assumed that before credential provider device #1 120 establishes a connection with credential seeker device #2 110-2, credential provider device #1 120 first establishes a connection with credential seeker device #1 110-1 and acquires credential token related information generated based on the account of user A from credential seeker device #1 110-1.

Each of credential broker #1, credential broker #2, and credential broker #3 900 stores and manages the user account. More specifically, credential broker #1 manages account #1 of user A and account #2 of user B (910), credential broker #2 manages account #3 of user A (920), and credential broker #3 manages account #4 of user B (930). Credential broker #1, credential broker #2, and credential broker #3 900 may be different application service providers, respectively. When user A logs in an account related to credential broker #1 and/or credential broker #2 by using credential seeker device #2 110-2, credential seeker device #2 110-2 may be provided with credential token related information related to user A from credential broker #1 and credential broker #2. Thereafter, credential seeker device #2 110-2 may automatically establish the connection with credential provider device #1 120 without the additional authentication with credential provider device #1 120 or the separate input of the user even though the connection is not established between credential seeker device #2 110-2 and credential provider device #1 120 based on the provided credential token related information related to user A.

Hereinafter, referring to FIGS. 10 and 11, a specific operation for the credential seeker device which does not establish the connection with the credential provider device to establish the connection with the credential provider device without the additional authentication will be described.

FIG. 10 is a flowchart showing an example of a user account management method for a connection between two devices proposed by the present disclosure.

More specifically, FIG. 10 relates to a user account management method when the user has only the account for one credential broker.

S10010: Credential broker #1 registers the account of user A and the account of user B.

S10020: Credential broker #2 registers the account of user A.

S10030: The credential provider device 120 establishes the connection with credential seeker device #1 110-1. The connection may be a connection based on Bluetooth low energy (BLE).

S10040: User B accesses credential seeker device #1 110-1 through the account of credential broker #1. More specifically, user B may access credential broker #1 by a scheme of logging in a specific application/service provided by a specific application/service provider serving as credential broker #1 by using an account related to the specific application/service.

S10050: Credential seeker device #1 110-1 generates a credential token based on the account of user B related to credential broker #1. The credential token may also be referred to as a certification token, and variously referred to as a range interpreted in the same thereas/similar thereto.

S10060: Credential seeker device #1 110-1 shares the credential token generated based on the account of user B related to credential broker #1 with the credential provider device 120 through a credential token share procedure. More specifically, the credential provider device 120 may receive a message including the credential token from credential seeker device #1 110-1 based on the connection established in S10030.

S10070: The credential provider device 120 transmits a token identifier (ID) included in an advertising packet. Here, the credential provider device 120 may generate the token ID based on the credential token provided from credential seeker device #1 110-1, and broadcast an advertising message including the token ID. Here, the token ID may be referred to as credential token ID, and variously referred to as within in the same thereas/similar thereto.

S10080: User B accesses credential seeker device #2 110-2. More specifically, user B may access credential broker #1 by a scheme of logging in a specific application/ service provided by a specific application/service provider serving as credential broker #2 by using an account related to the specific application/service.

S10090: Thereafter, credential seeker device #2 110-2 checks a user B token. Although not illustrated in FIG. 10, in step S11090, credential seeker device #2 110-2 may perform an operation for configuring an account based pairing (ABP) filter. In this case, when user B accesses credential seeker device #2 110-2 through the account which becomes a basis of the generation of the token ID related to user B, the operation for configuring the ABP filter may be successfully performed. The operation for configuring the ABP filter will be described below in more detail with reference to FIG. 16.

Further, the ABP filter may be various types of filters which enable the ABP operation to be performed, and may be a Bloom filter as an example. The Bloom filter may be configured in various sizes according to the type of AD included in the advertising message transmitted by the credential provider device.

The ABP filter may be referred to as a token filter, and variously referred to as a range interpreted in the same thereas/similar thereto.

S10100: Credential seeker device #2 110-2 checks the token ID of user B transmitted by the credential provider device 120 through the ABP filter, and performs ABP. That is, whether the device authentication succeeds between credential seeker device #2 110-2 and the credential provider device 120 may be determined based on the user accesses credential seeker device #2 110-2 through the account (i.e., the account related to credential broker #1) related to user B identified based on the token ID of user B.

When the described contents are expressed more generally, it may be appreciated that whether the device authentication succeeds between credential seeker device #2 110-2 and the credential provider device 120 may be determined based on the account related to user B identified based on the token ID of user B matches the account of user B related to the ABP filter configured in credential seeker device #2 110-2.

More specifically, when the account related to user B identified based on the token ID matches the account related to user B related to the ABP filter, the device authentication device may succeed, and the connection between credential seeker device #2 110-2 and the credential provider device 120 may be established without the additional authentication or the separate user input. On the contrary, when the account related to user B identified based on the token ID does not match the account related to user B related to the ABP filter, the device authentication device may fail, and the connection between credential seeker device #2 110-2 and the credential provider device 120 may not be established.

FIG. 11 is a flowchart illustrating another example of a user account management method for a connection between two devices proposed by the present disclosure.

More specifically, FIG. 11 relates to a user account management method when the user has multiple accounts for multiple credential brokers. Further, it is assumed that steps S11010 to S11100 described in FIG. 11 are performed after steps S10010 to S10100 described in FIG. 10, and this is just for convenience of description, and steps S11010 to S11100 of FIG. 11 may be performed independently regardless of steps S10010 to S10100 described in FIG. 10, of course.

In FIG. 11, credential broker #1 manages the account of user A and the account of user B, and credential broker #2 manages the account of user A. That is, at least one user account related to a specific user may be user accounts related to different applications, respectively.

S11010: The credential provider device 120 establishes the connection with credential seeker device #1 110-1. The connection may be a connection based on Bluetooth low energy (BLE).

S11020: User A accesses credential seeker device #1 110-1 through the account of credential broker #1 and/or the account of credential broker #2. More specifically, user B may access credential broker #1 by a scheme of logging in the first application/service and/or the second application/ service by using (i) a first account related to a first application/service provided by a first application/service provider serving as credential broker #1 and/or (ii) a second account related to a second application/service provided by a second application/service provider serving as credential broker #2.

S11030: Credential seeker device #1 110-1 generates the credential token based on the first account related to credential broker #1 and/or the second account related to credential broker #2. More specifically, credential seeker device #1 110-1 may generate a first account based credential token related to credential broker #1 of user A or generate a second account based credential token related to credential broker #2 of user A.

Further, when user A has two or more accounts related to two or more credential brokers, credential seeker device #1 110-1 may generate a single credential token based on two or more accounts. In this case, credential seeker device #1 110-1 may generate the single credential token based on the first account related to credential broker #1 and the second account related to credential broker #2. The credential token may also be referred to as a certification token, and variously referred to as a range interpreted in the same thereas/similar thereto. For convenience of description, hereinafter, only a case where credential seeker device #1 generates the single credential token will be described.

S11040: Credential seeker device #1 110-1 shares the single credential token generated based on the first account of user A related to credential broker #1 and the second account of user A related to credential broker #2 with the credential provider device 120 through the credential token share procedure. More specifically, the credential provider device 120 may receive a message including the single credential token from credential seeker device #1 110-1 based on the connection established in S11010.

S11050: Credential seeker device #1 110-1 manages the ABP filter for two users, i.e., user A and user B. That is, credential seeker device #1 110-1 may configure the ABP filter for multiple users, and manage the credential token for multiple users. Further, when the ABP filter of credential seeker device #1 110-1 receives a specific token ID, the ABP filter may notify the specific token ID to the user. More specifically, when credential seeker device #1 110-1 receives the token ID related to user A and/or user B, credential seeker device #1 110-1 may notify that the token ID related to user A and/or user B is received.

The credential provider device 20 stores two token IDs related to user A and user B, respectively in a token store. That is, when multiple users use the credential provider device 120, the token store may store the token ID for each of multiple users. Further, when a token ID for a specific user is already generated, if a user account identified based on the already generated token ID and a user account at a current time point are different, the token store of the credential provider device 120 may remove the already generated token ID and update the token ID.

S11060: The user may configure a token ID to be included in the advertising packet by the credential seeker device 120 through token ID setting. More specifically, according to a user configuration, the credential seeker device may transmit some/all of the token ID of user A and/or the token ID of user B included in the advertising packet. Hereinafter, for convenience of description, only a case where the user configures all token IDs stored in the token store of the credential seeker device to be included in the advertising packet will be described.

S11070: The credential provider device 120 transmits both the token ID of user A and the token ID of user B included in the advertising packet. Here, the credential provider device 120 may generate the token ID for user A based on the single credential token related to user A provided from credential seeker device #1 110-1, and broadcast the advertising message including two token IDSs for user A and user B.

S11080: User A accesses credential seeker device #2 110-2 through the first account related to credential broker #1 and/or the second account related to credential broker #2.

S11090: Thereafter, credential seeker device #2 110-2 checks a user A token. Although not illustrated in FIG. 11, in step S11090, credential seeker device #2 110-2 may perform an operation for setting an account based pairing (ABP) filter. In this case, when user A accesses credential seeker device #2 110-2 through the account (i.e., the first account and the second account) which becomes the basis of the generation of the token ID related to user A, the operation for configuring the ABP filter may be successfully performed. The operation for setting the ABP filter will be described below in more detail with reference to FIG. 16.

S11100: Credential seeker device #2 110-2 checks the token ID of user A transmitted by the credential provider device 120 through the ABP filter, and performs ABP. That is, whether the device authentication succeeds between credential seeker device #2 110-2 and the credential provider device 120 may be determined based on the user accesses credential seeker device #2 110-2 through at least one account of the accounts (i.e., the first account and the second account) related to user A identified based on the token ID of user A.

For example, when user A accesses credential seeker device #2 110-2 with the first account which is one of the first account and the second account identified from the token ID of user A, the device authentication may succeed, and the connection may be established between credential provider device 120 and credential seeker device #2 110-2. In other words, when user A accesses credential seeker device #2 110-2 with the first account which is one of the first account and the second account identified from the token ID of user A, the ABP filter configuration in credential seeker device #2 110-2 checks the token ID related to user A included in the advertising message transmitted by the credential provider device 120 through the ABP filter, and as a result, the device authentication may succeed and the connection may be established between the credential provider device 120 and credential seeker device #2 110-2 without the additional authentication.

When the described contents are expressed more generally, it may be appreciated that whether the device authentication succeeds between credential seeker device #2 110-2 and the credential provider device 120 may be determined based on at least one account related to user A identified based on the token ID of user A matches at least one of one or more accounts related to user A related to the ABP filter configured in credential seeker device #2 110-2.

More specifically, when at least one account related to user A identified based on the token ID matches at least one of one or more accounts related to user A related to the ABP filter, the device authentication device may succeed, and the connection between credential seeker device #2 110-2 and the credential provider device 120 may be established without the additional authentication or the separate user input. On the contrary, when at least one account related to user A identified based on the token ID does not match all of one or more accounts related to user A related to the ABP filter, the device authentication device may fail, and the connection between credential seeker device #2 110-2 and the credential provider device 120 may not be established.

Additionally, in the above-described account based device authentication method, the types of the credential seeker device and the credential provider device need to be considered upon the automatic connection between the credential seeker device and the credential provider device.

More specifically, there is an available profile and service for each device. For example, when the credential provider device is the headset, the credential provider device may provide an audio function such as A2DP or a telephony service. Further, when the credential provider device is a mouse of a computer, the credential provider device ma provide a cursor manipulation function through USB based information such as a human interface device (HID) profile.

When the connection between the credential seeker device and the credential provider device is performed based on account based pairing (ABP), if providable profiles and services of the devices are not considered, the connection between the devices may be successfully performed, but after the connection establishment, there may be no service which the user may use through two connected devices. For example, the laptop computer and the mouse are connected by using the ABP to perform the HID profile, but if a printer and the mouse are connected, there may be no service which the user may use through the connection between the printer and the mouse. Therefore, the credential seeker device and the credential provider device may share the profile and the service which the credential provider device may provide through a provider profile/service capability share procedure with the credential seeker device. Hereinafter, the provider profile/service capability share procedure will be described in detail with reference to FIG. 12.

FIG. 12 is a flowchart illustrating another example of a user account management method for a connection between two devices proposed by the present disclosure.

In FIG. 12, credential broker #1 manages the account of user A and the account of user B, and credential broker #2 manages the account of user A. Further, FIG. 12 relates to a case where user B generates the credential token through credential seeker device #1 110-1, and performs the ABP through credential seeker device #2 110-2.

The provider profile/service capability share procedure may be performed at least one time point of three time points S12050, S12070, and S12090 in the flowchart of FIG. 12 in association with the ABP.

S12010: The credential provider device 120 establishes the connection with credential seeker device #1 110-1. The connection may be a connection based on Bluetooth low energy (BLE).

S12020: User B accesses credential seeker device #1 110-1 through the account of credential broker #1. More specifically, user B may access credential broker #1 by a scheme of logging in a specific application/service provided by a specific application/service provider serving as credential broker #1 by using an account related to the specific application/service.

S12030: Credential seeker device #1 110-1 generates a credential token based on the account of user B related to credential broker #1. The credential token may also be referred to as a certification token, and variously referred to as a range interpreted in the same thereas/similar thereto.

S12040: Credential seeker device #1 110-1 shares the credential toke generated based on the account of user B related to credential broker #1 with the credential provider device 120 through a credential share procedure. More specifically, the credential provider device 120 may receive a message including the credential token from credential seeker device #1 110-1 based on the connection established in S12010.

S12050: After the credential token share procedure is performed, the credential provider device 120 shares which profile and service are usable with credential seeker device #2 110-2 in the process of granting/generating a token ID to be advertised. The credential seeker device 110-2 may perform filtering by considering both the profile and the service when configuring the APB filter. That is, when credential seeker device #2 110-2 determines that there is no service which may be provided thereto as a result of analyzing the profile and the service of the credential provider device 120, credential seeker device #2 110-2 may not establish the connection with the credential provider device 120 even though the user account identified from the token ID matches the account which the user uses to access credential provider device #2 110-2.

S12060: The credential provider device 120 transmits a token identifier (ID) included in an advertising packet. Here, the credential provider device 120 may generate the token ID based on the credential token provided from credential seeker device #1 110-1, and broadcast an advertising message including the token ID. Here, the token ID may be referred to as credential token ID, and variously referred to as within in the same thereas/similar thereto.

S12070: The credential provider device 120 may provide both profile and service information to credential seeker device #2 110-2 at the time of transmitting the token ID included in the advertising message. In this case, the credential seeker device 110-2 may determine whether to connect with the credential provider device 120 based on (i) the token ID and (ii) the profile and service information.

S12080: User B accesses credential seeker device #2 110-2. More specifically, user B may access credential broker #1 by a scheme of logging in a specific application/service provided by a specific application/service provider serving as credential broker #2 by using an account related to the specific application/service.

S12090: The credential provider device 120 may provide the profile and service information to credential seeker device #2 110-2 after step S12080 of the user.

More specifically, credential seeker device #2 110-2 may request the connection establishment to the credential provider device determined only by the token ID, receive the profile and service information from the credential provider device 120 based on a connected link, and determine whether to finally connect the ABP based on the profile and service information received based on the link.

S12100: Thereafter, credential seeker device #2 110-2 checks a user B token. Although not illustrated in FIG. 10, in step S11090, credential seeker device #2 110-2 may perform an operation for setting an account based pairing (ABP) filter. In this case, when user B accesses credential seeker device #2 110-2 through the account which becomes a basis of the generation of the token ID related to user B, the operation for setting the ABP filter may be successfully performed. The operation for setting the ABP filter will be described below in more detail with reference to FIG. 16.

S12110: Credential seeker device #2 110-2 checks the token ID of user B transmitted by the credential provider device 120 through the ABP filter, and performs ABP. That is, whether the device authentication succeeds between credential seeker device #2 110-2 and the credential provider device 120 may be determined based on the user accesses credential seeker device #2 110-2 through the account (i.e., the account related to credential broker #1) related to user B identified based on the token ID of user B.

When the described contents are expressed more generally, it may be appreciated that whether the device authentication succeeds between credential seeker device #2 110-2 and the credential provider device 120 may be determined based on the account related to user B identified based on the token ID of user B matches the account of user B related to the ABP filter configured in credential seeker device #2 110-2.

FIGS. 13 and 14 are diagrams illustrating an example of credential token generation in a credential searcher device and token ID management in a credential provider device.

Referring to FIG. 13, the account of user A managed by credential broker #1 is referred to as account #1, the account of user B managed by credential broker #1 is referred to as account #2, and the account of user A managed by credential broker #2 is referred to as account #3.

User A is a user of credential seeker device #1 1310, and credential seeker device #1 1310 uses a total of two applications, i.e., application #1 and application #2. For example, application #1 and application #2 may be a music player and an airline application, respectively. Further, application #1 may be an application related to credential broker #1 and application #2 may be an application related to credential broker #2. In this case, both application #1 and application #2 are capable of using the ABP function by using the ABP profile. The credential token of user A may be generated by hashing account #1 and account #3.

User B is a user of credential seeker device #2 1320, and credential seeker device #2 1320 uses only application #3. For example, application #3 may be the music player application. Further, application #3 may be an application related to credential broker #1. Application #3 is capable of using the ABP function by using the ABP profile. The credential token of user B may be generated by hashing account #2.

Referring to FIG. 14, the credential seeker device may use a key 1410 which the credential broker provides to generate the credential token or also use an ABP key 1420. Here, the ABP key may be generated based on a link key used for communication between two devices. The communication between two devices may include Bluetooth communication.

Referring back to FIG. 13, the credential provider device 1330 may generate the token ID for each user based on the credential token shared with the credential seeker device 1310/1320. The credential provider device 1330 may store the generated token ID in the token store 1340 and transmit the advertising packet including the token ID. In this case, for efficient utilization of the advertising packet, the user of the credential provider device 1330 may select a token ID to be included in the advertising packet among the token IDs included (stored) in the token store. That is, in FIG. 13, the token store 1340 of the credential provider device 1330 may store the token ID for user A and the token ID for user B, and the user of the credential provider device 1330 may select a token ID to be included in the advertising packet to which the credential provider device 1330 is to transmit between the token ID for user A and the token ID for user B. The selection of the token ID to be included in the advertising packet may be performed by a scheme in which the credential provider device 1330 shows a user ID/name corresponding to the token ID to the user, and the user selects the user ID/name related to the token ID to be included in the advertising packet among the shown user IDs/names. The selection of the token ID of the user may be performed by a token ID manager of the credential provider device 1330.

FIG. 15 is a diagram illustrating another example of credential token generation in the credential searcher device.

More specifically, FIG. 15 relates to an example in which the credential seeker device generates one group credential token by grouping multiple credential tokens for multiple users.

Referring to FIG. 15(*a*), a credential provider device 1511 stores a token ID for each of user A, user B, user D, and user E.

Since a size of the advertising packet is limited, the credential provider device 1511 may determine the token ID to be included in the advertising packet through a negotiation with the credential seeker device. The token ID manager of the credential provider device 1511 may transmit the token ID determined through the negotiation with the credential seeker device included in the advertising packet based on a token frame of the advertising packet illustrated in FIG. 15(*b*). In the token frame illustrated in FIG. 15(*b*), field Token Flags may indicate whether the token ID included in the token frame is related to an individual account, an integrated account, or a guest account.

As illustrated in FIG. 15(*a*), when token IDs of four persons, i.e., user A, user B, user D, and user E are stored in the token store, the credential seeker device and the credential provider device may determine the token ID for each user not to be individually included in the advertising packet, and grouped and included. For example, when user A and user B are a family, both the token ID (token B) of user A and the token ID (token A) of user B are not included in the advertising packet, but a token ID corresponding to account "family" which is a group account may be generated and included in the token frame of the advertising packet. More specifically, as illustrated in FIG. 15(*c*), the credential seeker device may generate one group credential token based on the account of each of user A and user B which are a family relationship, and share the group credential token with the credential provider device. Thereafter, the credential provider device may generate a group token ID based on the shared group credential token. As such, the group credential token and the group token ID are generated and managed to save a storage space of the token store of the credential seeker device and the credential provider device.

Hereinafter, a user account information acquiring method of the credential seeker device and an account linkage method between the credential brokers will be described with reference to FIGS. 16 to 18.

FIG. 16 is a diagram illustrating an example of a method of acquiring user account information in a credential searcher device. More specifically, FIG. 16 relates to a case where credential token generation and token ID generation are completed between the credential provider device and a specific credential seeker device other than the credential seeker device of FIG. 16 before performing steps S16010 to S16040 illustrated in FIG. 16.

S16010: The user inputs, into a user browser of a specific application/service usable in the credential seeker device, account information thereof related to the specific application/service. The account information may be an account ID and a password related to the specific application/service. Here, the specific application/service may be an application/service including the ABP profile.

S16020: Since the specific application/service is the application/service including the ABP profile, the user of the credential seeker device may perform log-in to an APB web portal through step S16010. Thereafter, the credential seeker device requests registration of the credential seeker device itself and the credential provider device in the ABP web portal in order to use the ABP function. The registration request may be performed through a Navigate to Add Device procedure. Thereafter, the credential seeker device acquires a credential token to be used in the credential seeker device by exchanging a device authentication token. More specifically, when receiving the registration request from the credential seeker device, the ABP web portal requests the token to credential broker #1 and credential broker #2 which manage the account of the user, and each of credential broker #1 and credential broker #2 transfers the user account managed thereby to the ABP web portal. Thereafter, the ABP web portal transfers the credential token transferred from each of credential broker #1 and credential broker #2 to the credential seeker device.

S16030: As necessary, an additional authentication procedure/credential token exchange may be performed in the credential seeker device in order to use the ABP function. The additional authentication procedure/credential token exchange may be performed by a scheme in which each of credential broker #1 and credential broker #2 transmits a code (register code) for registration with an E-mail of the user, and the user inputs the transferred code for the registration.

S16040: After step S1603, the credential seeker device and the credential provider device may be registered as an ABP device, and the ABP filter may be configured in the credential seeker device. The credential seeker device in which the ABP filter is configured may check the token ID (token information) included in the advertising packet transmitted by the credential provider device, and perform the ABP based on the account of the user related to the ABP filter matches the account of the user identified based on the token ID.

Tables 4 to 6 below define parameters exchanged between the credential broker and the credential seeker device, and parameters of which exchange is required between the credential brokers.

More specifically, Table 4 relates to ABP account information from device description, and Table 5 relates to ABP account information of the credential token.

It may be checked whether the device supports digital rights management (DRM) in which contents are protected. Further, a mapping table between DRM information of the device description and DRM information of contents may be created. Here, the DRM information of the contents may be protocol info of contents for each CDS in UPnP. Source URI access/connection authority management may be performed based on device/account authority management information. Based on a content check/access authority management method, the account may be checked through BLE, and then connection/authority management may be performed.

TABLE 4

| Capability Item | Type | Example |
| --- | --- | --- |
| DRM Specific Name space | String | <root xmlns="urn:schemas-upnp-org:device-1-0" xmlns:ms="urn:microsoft-com:wmc-1-0"> |
| DRM Specific Information | String | <device ms:X MS SupportsWMDRM="true"> |
| DRM Name | String | WMDRM |
| DRM Version | String | |

TABLE 5

| Content Item | Type | Example |
| --- | --- | --- |
| Content ID | String | |
| Source URI | URI | http://168.192.1.1/DECE-DCC.uvvu |
| Network | String | * |
| Protocol | String | HTTP-GET |
| MIME Type | String | video/vnd.dece.mp4 |
| AdditionalInfo | String | * |
| DRM Name | String | DECE |
| DRM Version | String | 1.0 |

TABLE 6

| Key | Description |
| --- | --- |
| TOKEN STORE_SOURCE_URI | Source URI of the content is from res in ContentDirectory Service Properties of a CDS item in a DLNA DMS or a UPnP MediaServer Device which supports ContentDirectory Service:3 [UPNPCDS3] or higher |
| TOKEN STORE_STORE_NAME | Describes the name used to store the cached object on the target device. |
| TOKEN STORE_TYPE | Describes the MIME content type of the cached object as found in a CDS item, the third item of res@ProtocolInfo(e.g. video/vnd.dece.mp4 where res@ProtocolInfo = "http-get:*:video/vnd.dece.mp4:*") in a DLNA DMS or a UPnP MediaServer Device |
| TOKEN STORE_TOTAL_LENGTH | Total size of the Content (e.g, 1024 MB) |

FIG. 17 is a flowchart illustrating an example of a method of acquiring and storing a credential token in a credential searcher device. FIG. 17 relates to a case whether the user uses the ABP function in order to use a specific service/application. The specific service/application may be music hearing, screen sharing, etc.

When the user requests the service (S17000), the credential seeker device determines whether an ABP account is usable in a server (S17010).

When it is determined that the ABP account is not usable in the server, an error that the token may not be downloaded occurs (S17090).

On the contrary, when it is determined that the ABP account is usable in the server, the credential seeker device determines whether the ABP account is protected (S17020).

When it is determined that the ABP account is not protected, the error that the token may not be downloaded occurs (S17090).

On the contrary, when it is determined that the ABP account is protected, the credential seeker device acquires DRM information of the device (S17030), and acquires DRM information of content description (S17040). Here, a mapping table may be created between the DRM information of the device and the DRM information of the content description.

Thereafter, the credential seeker device determines whether the DRM of the token is supported (S17050).

When it is determined that the DRM of the token is not supported, the error that the token may not be downloaded occurs (S17090).

On the contrary, when it is determined that the DRM of the token is not supported, the credential seeker device acquires token information of the ABP account (S17060). The token information may be acquired from one or more credential brokers managing the user account, and the token information may be the above-described credential token.

Thereafter, the credential seeker device examines a validity of the token of the user (S17070)

When it is determined that the token of the user is not valid, the error that the token may not be downloaded occurs (S17090).

On the contrary, when it is determined that the token of the user is valid, the credential seeker device stores the token in the token store (S17080).

FIG. 18 is a flowchart illustrating an example of an ABP operation performed by a credential searcher device.

The credential seeker device determines whether the credential seeker device interlocks with the ABP account (S18010).

When it is determined that the credential seeker device does not interlock with the ABP account, it is determined whether there is the ABP account of the user (S18022).

When it is determined that there is no ABP account of the user, the ABP account is generated (S18032).

On the contrary, when it is determined that there is the ABP account of the user, the credential seeker device generates the token based on the ABP account (S18031), and registers the generated token in the credential broker (S1840). The generated token may be shared between the credential seeker device and the credential provider device.

The credential seeker device determines whether to perform an additional authentication with the credential broker.

When the additional authentication with the credential broker is not performed, the credential seeker device generates the ABP account (S18032). Thereafter, step S18031 and the subsequent steps may be reperformed.

On the contrary, when the additional authentication with the credential broker is performed, ABP device check is performed (S18060), and through this, the credential seeker device may be registered in the ABP service and may use the ABP service.

Referring back to step S18010, when the credential seeker device interlocks with the ABP account, the credential seeker device may use the ABP service through an ABP based application including the ABP profile (S18021).

The user may remove the device registered in the ABP service (S18090). When removal of the device registered in the ABP service is requested, the user is requested with final check for the removal of the device (S18100).

When the user makes a response of removing the device for the final check, removal check for the device is performed (S18110).

On the contrary, when the user makes a response not of removing the device for the final check, step S18090 may be reperformed.

Referring back to step S18021, the credential seeker device determines whether the media/service is present in the credential provider device (S18070).

When it is determined that the media/service is not present in the credential provider device, another ABP device is selected (S18082).

When it is determined that the media/service is present in the credential provider device, the credential seek device uses the media/service provided by the credential provider device (S18081).

Additionally, the user may register the credential seeker device and the credential provider device in a Cloud through a Cloud service, and then manage the connection/authority after lease or rent. Table 7 below is a table related to elements when registering the credential seeker device and the credential provider device in the Cloud, and then managing the connection/authority after lease or rent.

TABLE 7

| Element | Description |
| --- | --- |
| Token ID | Logical ID for the token |
| Service ID | The serviced ID for the possible service corresponding with the token |
| Profile (capability) | Capability information supportable in service related device, e.g., standard definition (SD) and high definition (HD) may be supported |
| WebLoc | Locations of web page or direct HTTP links to ABP |
| SoldToken | Purchase information when rental tokens are purchased |
| PurchaseInfo | Retailer/broker information about the purchase |

The credential provider device and the credential seeker device should be able to designate a period in which the use of the token for the service may be restricted. In this case, the period in which the use of the token for the service may be restricted may be referred to as "Rights availability window", "expiration period", or "service restriction window".

A restriction type applied to the token/service may be as follows.

The token may be cancelled or replaced.

A download function may be restricted according to a specific region and a specific period.

A streaming service and media authority execution may also be similarly restricted.

The restriction type may be stored in the token, and the credential seeker device/credential broker may be updated at any time.

Credential Expiration and Refresh Method—(Method 2)

The method relates to expiration of the credential token and refresh of the credential token generated by the credential seeker device.

Hereinafter, the credential expiration and refresh method will be described in detail with reference to FIGS. 19 and 20.

FIG. 19 is a flowchart illustrating an example in which a method for credential termination and credential update is performed. More specifically, FIG. 19 relates to a case where user B possesses an account related to credential broker #1, credential seeker device #1 110-1 and credential seeker device #2 110-2 store the credential token of user B related to credential broker #1, and user B performs the ABP function by using credential seeker device #2.

S19010: Before the credential token generated based on the account of user B related to credential broker #1 is expired, the credential provider device 120 broadcasts the advertising message including the token ID generated based on the credential token (S19010).

S19020: When the credential seeker device generates the credential token, the generated credential token may be configured jointly with an expiration value related to a credential token expiration time point. In step S19020, the credential token generated based on the account of user B related to credential broker #1 is expired based on the expiration value. When the credential token value is expired, the credential token is removed from the ABP filter configured in the credential seeker devices 110-1 and 110-2.

Further, based on the credential token generated based on the account of user B related to credential broker #1 being expired, the credential provider device 120 removes the token ID generated based on the credential token (S19030). Since the credential provider device 120 generates the token ID based on the credential token in which the expiration value is set, the credential provider device 120 acquires the expiration value set in the credential token to determine a removal time point of the token ID. Additionally, the credential seeker devices 110-1 and 110-2 may separately notify the expiration value set in the credential token to the credential provider device 120. The credential provider device 120 may remove the token ID based on the expiration value acquired from the credential seeker devices 110-1 and 110-2.

S19030: User B accesses credential seeker device #2 110-2 based on the account of user B related to credential broker #1.

S19040: Since the credential seeker device #2 110-2 removes the credential token generated based on the account of user B related to credential broker #1 from the ABP filter, and the credential provider device 120 removes the token ID generated based on the credential token, the ABP is not performed between two devices.

S19050: In order to refresh the expired credential token, a credential refresh procedure of user B is performed in each of (i) credential broker #1 and credential seeker device #1 110-1 and ii) credential broker #1 and credential seeker device #2 110-2.

S19060: Thereafter, the credential seeker device #2 110-2 shares the refreshed credential token with the credential provider device 120, and the credential provider device 120 newly generates the token ID based on the refreshed credential token.

S19070: The credential provider device 120 broadcasts the advertising message including the refreshed token ID.

S19080: When a procedure for credential refresh between credential seeker device #! 110-1 and credential broker #1 fails or is not performed in S19050, credential seeker device #1 110-1 receives the advertising message including the refreshed token ID to check that the credential token is not refreshed. Such an operation may be referred to as a credential refresh check procedure. In this case, the credential refresh procedure may be performed between credential broker #1 and credential seeker device #1 110-1.

FIG. 20 is a flowchart illustrating another example in which the method for credential update is performed.

More specifically, in FIG. 20, user A possesses the accounts related to credential broker #1 and credential broker #2, and one credential seeker device 110 performs the ABP function with multiple credential provider devise 120-1 to 120-3.

S20010: The credential seeker device 110 manages the credential tokens related to the accounts related to credential broker #1 and credential broker #2.

S20020: Credential provider device #1 120-1 manages the token IDs related to both of credential broker #1 and credential broker #2, and broadcasts the advertising message including the token IDs related to both credential broker #1 and credential broker #2.

Further, since the credential seeker device 110 manages only the account related to credential broker #1 at the time point of performing the credential token share procedure between the credential seeker device 110 and credential provider device #2 120-2, credential provider device #2 120-2 manages the token ID related only to the account related to credential broker #1. In this case, credential provider device #2 120-2 broadcasts the advertising message including the token ID related only to the account related to credential broker #1.

Further, since the credential seeker device 110 manages only the account related to credential broker #2 at the time point of performing the credential token share procedure between the credential seeker device 110 and credential provider device #3 120-3, credential provider device #3 120-3 manages the token ID related only to the account related to credential broker #2. In this case, credential provider device #3 120-3 broadcasts the advertising message including the token ID related only to the account related to credential broker #2.

The credential seeker device 110 determines whether the account information (token ID) of the user is updated in credential provider devices #2 and #3 based on the advertising message received from credential provider devices #2 and #3 120-2 and 120-3. In FIG. 20, since credential provider device #2 120-2 manages the token ID related only to the account related to credential broker #1 and credential provider device #3 120-3 manages the token ID related only to the account related to credential broker #2, the credential seeker device 110 determines that the account information of credential provider device #2 120-2 and credential provider device #3 120-3 is not updated. The credential seeker device 110 may notify, to the user, that the account information of credential provider device #2 120-2 and credential provider device #3 120-3 is not updated.

S200230: The credential seeker device 110 acquires a user input regarding whether the account information of credential provider device #2 120-2 and credential provider device #3 120-3 being updated from the user which is notified with the account information of credential provider device #2 120-2 and credential provider device #3 120-3 not being updated. Thereafter, the credential seeker device 110 transfers the account information related to credential broker #2 to credential provider device #2 120-2 and transfers the account information related to credential broker #1 to credential provider device #3 120-3.

Credential provider devices 120-2 and 120-3 acquiring additional account information (credential token) from the credential seeker device 110 may newly generate/refresh the token ID based on the account information. The above-described procedure may be referred to as an account joint procedure.

S12040: The credential provider devices 120-2 and 120-3 newly generating/refreshing the token ID in step S12030 broadcast the advertising message including the token IDs related to both the accounts related to credential broker #1 and credential broker #2.

Additionally, in a case where multiple devices constitute the network by sharing the same credential token, a method for reinforcing the credential of the network will be described.

FIG. 21 is a diagram illustrating an example of a scheme of constituting a network of which credential is reinforced.

In FIG. 21(a), multiple devices constitute the network by sharing the same credential token/key. More specifically, a network G1 illustrated in FIG. 21 is a BLE mesh network, and is constituted by devices S1 to S9. The network G1 periodically refreshes the credential token/key for the credential, and this is managed by a G1 manager (broker).

As illustrated in FIG. 21(b), in some cases, the manager of the network G1 should be able to restrict that some devices S5, S8, and S9 are separated from the network G1 to constitute a separate network G2.

In order to restrict the separate network G2 is constituted, the manager of the network G1 may apply an enhanced credential refresh scheme (ECRS) to the network. More specifically, in the network to which the ECRS is applied, routing is not just determined according to performance such as a shortest hop or a shortest delay, but is configured as a route for enhancing the credential. That is, it is possible to transfer the message between the devices constituting the network only through the route configured to reinforce the credential. More specifically, when the ECRS is applied to the network G1 in FIG. 21(a), even though a distance between S9 and S5 is a distance at which S9 is capable of directly transmitting the message to S5, S9 should transmit the message to S5 through S4. Here, only when an authentication that S5 also receives the message transmitted by S9 through S4 is completed, the message transmitted by S9 is interpreted as a valid packet. The device of the node such as S4 may be referred to as security relay node. When the ECRS is applied to the network G1, all nodes constituting the network G1 may transmit a data packet to another node only through a specific security relay node. The security relay node may be periodically changed.

In the network G1 to which the ECRS is applied, a message encrypted and authenticated only with the credential token/key which is used before the ECRS is applied to the network G1 is not valid without passing through the security relay node. As illustrated in FIG. 21(b), in the case of an IoT local network to which the ECRS is applied, when the separate network G2 constituted by S5, S8, and S9 is configured, the operation of the network G2 is impossible.

Hereinafter, a specific utilization example of the methods proposed by the present disclosure will be described with reference to FIGS. 22 to 27.

FIGS. 22 and 23 are diagrams illustrating an example in which a method proposed by the present disclosure is applied to an in-flight system of an aircraft.

Referring to FIG. 22(a), when an aircraft using customer boards an aircraft and uses an in-flight entertainment (IFE) system, Bluetooth/Wi-Fi devices 2202 of other customers are shown in a seek result of the IFE system upon device seeking for connecting a bring your own device BYOD) 2201 to the IFE system. This causes a difficulty in connecting to the BYOD using Bluetooth/Wi-Fi to the IFE system of the aircraft using customer.

In order to solve such a problem, when the customer makes the device thereof be close to the IFE by using proximity detection and the ABP proposed by the present disclosure, the IFE system and the device of the customer may be automatically connected to each other. That is, the ABP may be performed based on an airline application account.

Referring to FIG. 22(b), when reservation for seating through an airline application before boarding, a device registration procedure of a passenger may be added and a procedure of registering device information in the airline application (credential broker) may be added (S22010 and S22020).

Thereafter, when the passenger makes the device thereof be close to the IFE after boarding the aircraft, the IFE may recognize the proximity of the passenger device and the connection between two devices may be automatically established through the ABP (S22030).

Referring to FIG. 23, when device 1 (earphone) and device 2 (smartphone) of the passenger get close to the IFE system, each device is automatically connected to the IFE system, and each of device 1 (earphone) and device 2 (smartphone) uses a service provided by the IFE system based on the established connection.

FIG. 24 is a diagram illustrating another example in which the method proposed by the present disclosure is applied to the in-flight system of the aircraft.

The method proposed by the present disclosure is applied to the in-flight system of the aircraft, and as a result, the passenger may conveniently connect the device thereof to the IFE system by using the ABP service. Since passenger device information is interlocked in advance through the airline application before boarding (S24010), when the devices of the passenger get close to the IFE system after the passenger boards (S24020 to S24040), the automatic connection is performed based on pre-registered information (S24040).

FIG. 25 is a diagram illustrating an example of a software configuration diagram when the method proposed by the present disclosure is applied to the in-flight system of the aircraft.

Referring to FIG. 25, an ABP manager manages an account based automatic connection function proposed by the present disclosure. Further, Bluetooth Auto Connect senses a close device to attempt the automatic connection according to implementation contents for each manufacturer. In this case, the Bluetooth Auto Connect may interlock with the account based automatic connection function through the ABP manager.

IFE auto connect (AC) api of FIG. 25 provides API for account based automatic connection to an application layer. For example, the API for the automatic connection may be Auto Connect Enable, Auto Connect Start, Auto Connect Account Discovery, etc.

FIG. 26 is a flowchart illustrating an example in which a device authentication method proposed by the present disclosure is performed and FIG. 27 illustrates an example of a message format transmitted in a process of performing a device authentication method proposed by the present disclosure.

S26010: The credential provider device transmits token related data acquired through a token share procedure in advance, which is included in the advertising message to surroundings. The format of the advertising message may be illustrated in FIG. 27(a). That is, the token related data included in the advertising message may be token ID, broker ID or name, account ID or name, service information, and transmission power.

S26020: The credential seeker device discovers a proximate credential provider device through proximity check. The credential seeker device checks whether the credential provider device supports the ABP service based on the advertising message transmitted by the discovered credential provider device. Thereafter, the credential seeker device checks user information corresponding to Token Frame of AD Data of FIGS. 27(b), 27(c), and 27(d), and notifies, to the user, confirming whether to perform the ABP.

S26030: When the credential seeker device receives confirmation for the ABP performing as an input, the credential seeker device performs an account based automatic connection request.

FIG. 28 is a flowchart illustrating an example of an operation implemented in a third device for performing a method of performing, by a third device, a device authentication in a wireless communication system proposed by the present disclosure.

More specifically, the third device establishes a connection with a first device in order to receive a credential token generated based on at least one user account related to a specific user (S2810).

Next, the third device receives, from the first device, a first message including the credential token based on the established connection (S2820).

Thereafter, the third device broadcasts an advertising message including a token identifier (ID) generated based on the credential token (S2830).

Next, the third device establishes a connection with a second device through the device authentication for the second device based on the token ID (S2840). Here, whether or not the device authentication succeeds is determined based on whether (i) the at least one user account related to the specific user identified based on the token ID matches (ii) at least one of one or more account related to an account based pairing filter configured in the second device.

Further, the third device includes a transmitter for transmitting a radio signal; a receiver for receiving a radio signal; and a processor operatively connected to the transmitter and the receiver, and the processor may be configured to perform the operation described in FIG. 28.

More specifically, the processor controls the transmitter and the receiver to establish a connection with a first device to be provided with a credential token generated based on at least one user account related to a specific user.

Further, the processor controls the receiver, based on the established connection, to receive, from the first device, a first message including the credential token.

Further, the processor controls the transmitter to broadcast an advertising message including token ID (identifier) generated based on the credential token.

Thereafter, the processor controls the transmitter and the receiver, based on the token ID, to establish a connection with a second device based on the device authentication for the second device. Here, whether or not the device authentication succeeds is determined based on whether (i) the at least one user account related to the specific user identified based on the token ID matches (ii) at least one of one or more account related to an account based pairing filter configured in the second device.

It is apparent to those skilled in the art that the present disclosure can be embodied in other specific forms without departing from the essential characteristics of the present disclosure. Accordingly, the foregoing detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

The invention claimed is:

1. A method of performing a device authentication, by a third device, in a short-range wireless communication system, the method comprising:
establishing a connection with a first device to be provided with a credential token generated based on at least one user account related to a specific user;
based on the established connection, receiving, from the first device, a first message including the credential token;
generating, by the third device, a token identifier (ID) based on the received credential token;
storing the token ID in a token store;

broadcasting an advertisement message including the token ID;

transmitting, separately from the advertisement message, profile and service information of the third device to a second device; and based on the token ID, establishing a connection with the second device based on the device authentication for the second device, wherein whether or not the device authentication succeeds is determined based on whether (i) the at least one user account related to the specific user identified based on the token ID matches (ii) at least one of one or more account related to an account based pairing filter configured in the second device, wherein, based on an expiration value associated with the credential token being reached, the token ID is removed from the token store and is excluded from the advertisement message.

2. The method of claim 1, wherein based on that (i) the at least one user account related to the specific user identified based on the token ID matches (ii) the at least one of the one or more account related to the account based pairing filter configured in the second device, the device authentication succeeds.

3. The method of claim 1, wherein based on that (i) the at least one user account related to the specific user identified based on the token ID is different from (ii) all of the at least one of the one or more account related to the account based pairing filter configured in the second device, the device authentication fails.

4. The method of claim 1, wherein the credential token is a single credential token generated by integrating the at least one user account related to the specific user, and wherein the token ID is an integrated token ID generated based on the single credential token.

5. The method of claim 1, wherein based on a presence of another user of the first device in addition to the specific user, further comprising:

establishing a connection with the first device to be provided with another credential token generated based on at least one user account related to the another user;

based on the established connection, receiving, from the first device, a second message including the another credential token; and generating another token ID based on the another credential token, wherein the another token ID is stored in the token store.

6. The method of claim 5, further comprising:

based on the credential token and the another credential token, generating a group token ID in which on the credential token and the another credential token are grouped, wherein the advertising message includes the group token ID.

7. The method of claim 1, wherein based on a removal of the token ID, the device authentication based on the token ID is not performed.

8. The method of claim 1, wherein based on that the specific user uses another user account in addition to the at least one user account related the specific user after a time of the token ID is generated, further comprising:

receiving, from the first device, a second message including information on the another user account.

9. The method of claim 8, further comprising:

updating the token ID based on the information on the another user account, wherein the updated token ID is related to the at least one user account related to the specific user and the another user account.

10. The method of claim 9, wherein an advertisement message transmitted after the token ID is updated is transmitted including the updated token ID.

11. The method of claim 1, wherein the at least one user account related to the specific user is a user account related to a different application, respectively.

12. The method of claim 1, wherein the third device is included in a mesh network including a plurality of devices to form a part of the mesh network, wherein all messages exchanged between the plurality of devices are transmitted to another device only through the third device.

13. A third device of performing a device authentication in a short-range wireless communication system, the third device comprising:

a transmitter for transmitting a radio signal;

a receiver for receiving a radio signal; and a processor operatively connected to the transmitter and the receiver, wherein the processor is configured to:

establish a connection with a first device to be provided with a credential token generated based on at least one user account related to a specific user;

based on the established connection, receive, from the first device, a first message including the credential token;

generate, by the third device, a token identifier (ID) based on the received credential token;

store the token ID in a token store;

broadcast an advertisement message including the token ID;

transmit, separately from the advertisement message, profile and service information of the third device to a second device; and based on the token ID, establish a connection with the second device based on the device authentication for the second device, wherein whether or not the device authentication succeeds is determined based on whether (i) the at least one user account related to the specific user identified based on the token ID matches (ii) at least one of one or more account related to an account based pairing filter configured in the second device, wherein, based on an expiration value associated with the credential token being reached, the token ID is removed from the token store and is excluded from the advertisement message.

\* \* \* \* \*